US012617446B2

(12) United States Patent
Follmann et al.

(10) Patent No.: US 12,617,446 B2
(45) Date of Patent: May 5, 2026

(54) ELECTRIC FOLDING WAGON

(71) Applicant: GOLABS Inc., Carrollton, TX (US)

(72) Inventors: Ryan Matthew Follmann, Fitchburg,
WI (US); Eric Charles Masters,
Mount Horeb, WI (US)

(73) Assignee: GOLABS Inc., Carrollton, TX (US)

( * ) Notice: Subject to any disclaimer, the term of this
patent is extended or adjusted under 35
U.S.C. 154(b) by 346 days.

(21) Appl. No.: 18/370,008

(22) Filed: Sep. 19, 2023

(65) Prior Publication Data

US 2025/0074491 A1      Mar. 6, 2025

Related U.S. Application Data

(60) Provisional application No. 63/536,099, filed on Sep.
1, 2023.

(51) Int. Cl.
B62B 5/00          (2006.01)
B60L 53/51         (2019.01)
B62B 3/00          (2006.01)
B62B 3/02          (2006.01)
B62B 5/06          (2006.01)
(Continued)

(52) U.S. Cl.
CPC ............ B62B 5/0069 (2013.01); B60L 53/51
(2019.02); B62B 3/002 (2013.01); B62B 3/02
(2013.01); B62B 5/0036 (2013.01); B62B
5/0053 (2013.01); B62B 5/06 (2013.01); E05F
15/70 (2015.01); B62B 2205/20 (2013.01);
(Continued)

(58) Field of Classification Search
CPC ....... B62B 5/0069; B62B 3/02; B62B 5/0036;
B62B 5/0053; B62B 5/06; B62B 3/002;
B62B 2205/20; B62B 5/0433; B62B
2202/023; B62B 3/007; B62B 3/025;
B62B 5/0013; B62B 5/004; B62B 5/0046;
B62B 5/067; B60L 53/51; B60L 8/003;
E05F 15/70; E05Y 2400/628; E05Y
2900/542; H02S 20/30
See application file for complete search history.

(56) References Cited

U.S. PATENT DOCUMENTS

| | | | |
|---|---|---|---|
| 4,796,909 A | * | 1/1989 | Kirkendall ................ B62B 3/02 |
| | | | 180/906 |
| 5,653,458 A | * | 8/1997 | Chaparian ................ B62B 3/02 |
| | | | 280/30 |

(Continued)

FOREIGN PATENT DOCUMENTS

| | | | |
|---|---|---|---|
| KR | 200494467 Y1 | * 10/2021 | ........... B62B 5/0076 |
| KR | 102324477 B1 | * 11/2021 | ............. B62B 5/087 |

*Primary Examiner* — James A Shriver, II
*Assistant Examiner* — Ian Bryce Shelton
(74) *Attorney, Agent, or Firm* — AP3 Law Firm PLLC

(57)          ABSTRACT

A foldable wagon configurable in a use configuration and a
folded configuration includes a frame that is foldable. The
frame includes: a front frame assembly; a rear frame assem-
bly; a center linkage disposed laterally between the front
frame assembly and the rear frame assembly; an upper pivot
bracket; a lower pivot bracket; and a middle pivot bracket
disposed vertically between the upper pivot bracket and the
lower pivot bracket, where the middle pivot bracket is
slidable along the center linkage, where the front frame
assembly and the rear frame assembly are pivotally con-
nected to the upper pivot bracket, the lower pivot bracket,
and the middle pivot bracket.

20 Claims, 17 Drawing Sheets

(51) Int. Cl.
  *E05F 15/70* (2015.01)
  *H02S 20/30* (2014.01)
(52) U.S. Cl.
  CPC ... *E05Y 2400/628* (2013.01); *E05Y 2900/542* (2013.01); *H02S 20/30* (2014.12)

(56) References Cited

U.S. PATENT DOCUMENTS

| | | | | |
|---|---|---|---|---|
| 5,957,482 | A * | 9/1999 | Shorter | B62B 3/007 |
| | | | | 280/47.35 |
| 6,733,026 | B1 * | 5/2004 | Robberson | B62B 3/007 |
| | | | | 280/30 |
| 7,523,955 | B2 * | 4/2009 | Blair | B62B 3/007 |
| | | | | 280/47.38 |
| 7,762,363 | B1 | 7/2010 | Hirschfeld | |
| 8,453,771 | B1 | 6/2013 | Hirschfeld | |
| 9,327,749 | B2 | 5/2016 | Young et al. | |
| 9,643,638 | B1 * | 5/2017 | Wittliff, III | G05D 1/0011 |
| 9,925,999 | B2 * | 3/2018 | Young | B62B 5/0073 |
| 9,956,981 | B1 * | 5/2018 | Fitzwater | E04H 15/06 |
| 10,040,470 | B1 * | 8/2018 | Horowitz | B62B 3/102 |
| 10,099,712 | B1 | 10/2018 | Sun | |
| 10,214,230 | B2 * | 2/2019 | Delgatty | B62B 3/022 |
| 10,464,588 | B1 * | 11/2019 | Lin | B62B 7/08 |
| 10,525,998 | B2 | 1/2020 | Young et al. | |
| 10,583,852 | B2 * | 3/2020 | Fitzwater | B62B 7/008 |
| 10,640,159 | B2 | 5/2020 | Bliss | |
| 11,247,708 | B2 | 2/2022 | Wang et al. | |
| 11,370,467 | B1 * | 6/2022 | Horowitz | B62B 3/007 |
| 11,414,114 | B2 | 8/2022 | Kramer | |
| 11,465,664 | B1 * | 10/2022 | Choi | B62B 3/025 |
| 11,981,364 | B2 * | 5/2024 | Ma | B62B 5/0461 |
| 2008/0258435 | A1 * | 10/2008 | Blair | B62B 3/007 |
| | | | | 280/639 |
| 2018/0118243 | A1 * | 5/2018 | Fitzwater | B62B 7/008 |
| 2018/0118246 | A1 * | 5/2018 | Fitzwater | E04H 15/60 |
| 2018/0215404 | A1 * | 8/2018 | Hayashi | B62B 5/004 |
| 2019/0265717 | A1 | 8/2019 | McHale et al. | |
| 2020/0031377 | A1 * | 1/2020 | Delgatty | B62B 3/022 |
| 2020/0142397 | A1 * | 5/2020 | Kim | G05D 1/0016 |
| 2020/0346352 | A1 * | 11/2020 | Kim | G01S 17/931 |
| 2021/0380153 | A1 * | 12/2021 | Butler | B62B 5/0046 |
| 2022/0089207 | A1 | 3/2022 | Gavin | |
| 2022/0097748 | A1 * | 3/2022 | Ma | B62B 5/0433 |
| 2022/0185356 | A1 * | 6/2022 | Saavedra | B62B 7/00 |
| 2023/0068557 | A1 | 3/2023 | Burkhart | |
| 2023/0097550 | A1 * | 3/2023 | Shibata | B62B 5/0069 |
| | | | | 180/332 |
| 2023/0192167 | A1 | 6/2023 | Pang | |
| 2023/0219608 | A1 * | 7/2023 | Jiang | B62B 3/025 |
| | | | | 280/651 |
| 2023/0242168 | A1 * | 8/2023 | Clemmer | B62B 5/0013 |
| | | | | 280/651 |
| 2024/0075973 | A1 * | 3/2024 | Lin | B62B 5/0036 |
| 2024/0253685 | A1 * | 8/2024 | Lin | B62B 5/048 |
| 2024/0421755 | A1 * | 12/2024 | Gacka | H02S 20/30 |
| 2025/0050930 | A1 * | 2/2025 | Panah | B62B 5/0076 |

* cited by examiner

100

181

185

183

181

185

187

189

ELECTRIC FOLDING WAGON

RELATED APPLICATION

This application claims the benefit of U.S. Provisional Application No. 63/536,099, filed on Sep. 1, 2023, entitled "Electric Folding Wagon," which application is hereby incorporated herein by reference.

BACKGROUND

Wagons or carts are used for carrying or transporting heavy or bulky items from one location to another. In general, a wagon comprises a cargo hold or a basket to store or carry items; wheels to traverse over various surfaces or terrains; and handle(s) for pushing or pulling the wagon to the destination. The cargo hold or basket of the wagon usually has a bottom section and sidewalls that are made of suitable material(s) such as metal, wood, plastic, fabric, or combinations of these materials.

An operator or user may have difficulty pulling or pushing a non-motorized wagon with heavy load, especially when traversing rough terrains and/or when elevation changes. Wagons that are not foldable are difficult to store or transport. There is a need for a foldable, motorized wagon that can provide power assist for the operator, and is easy to store or transport.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

Figure 1:
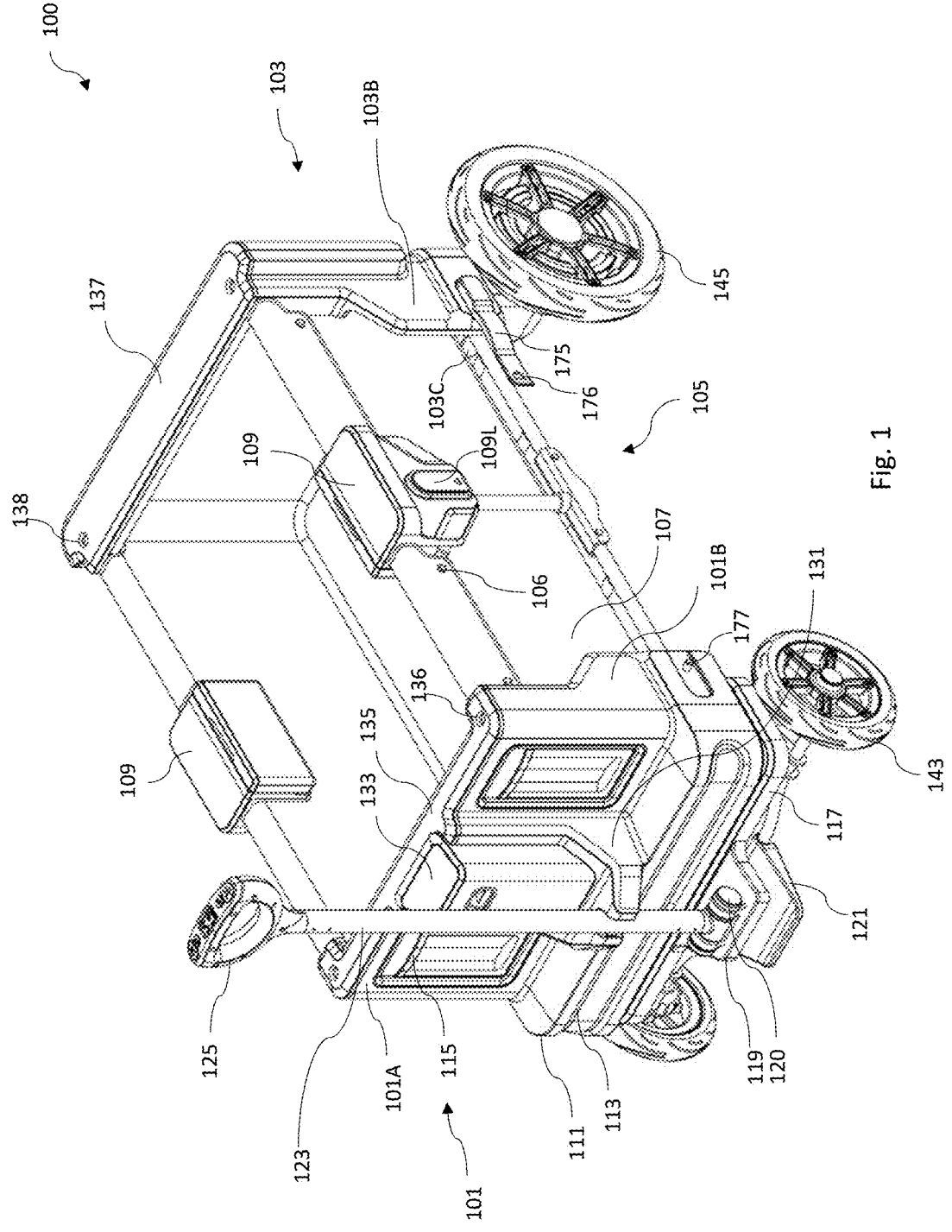
FIGS. 1-3 illustrate perspective views of an electric folding wagon from different viewing angles, in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component.

Figure 2:
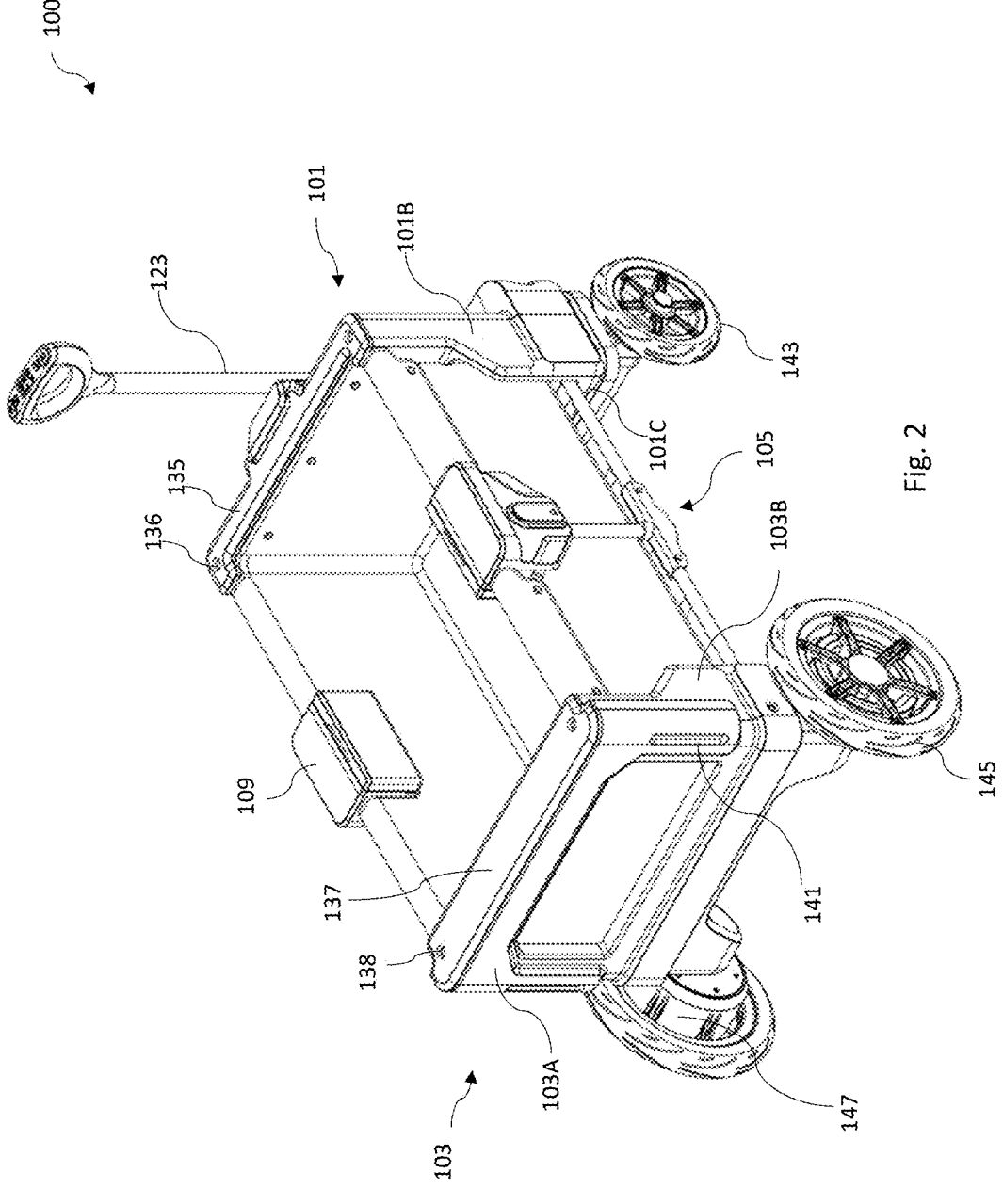
Figure 3:
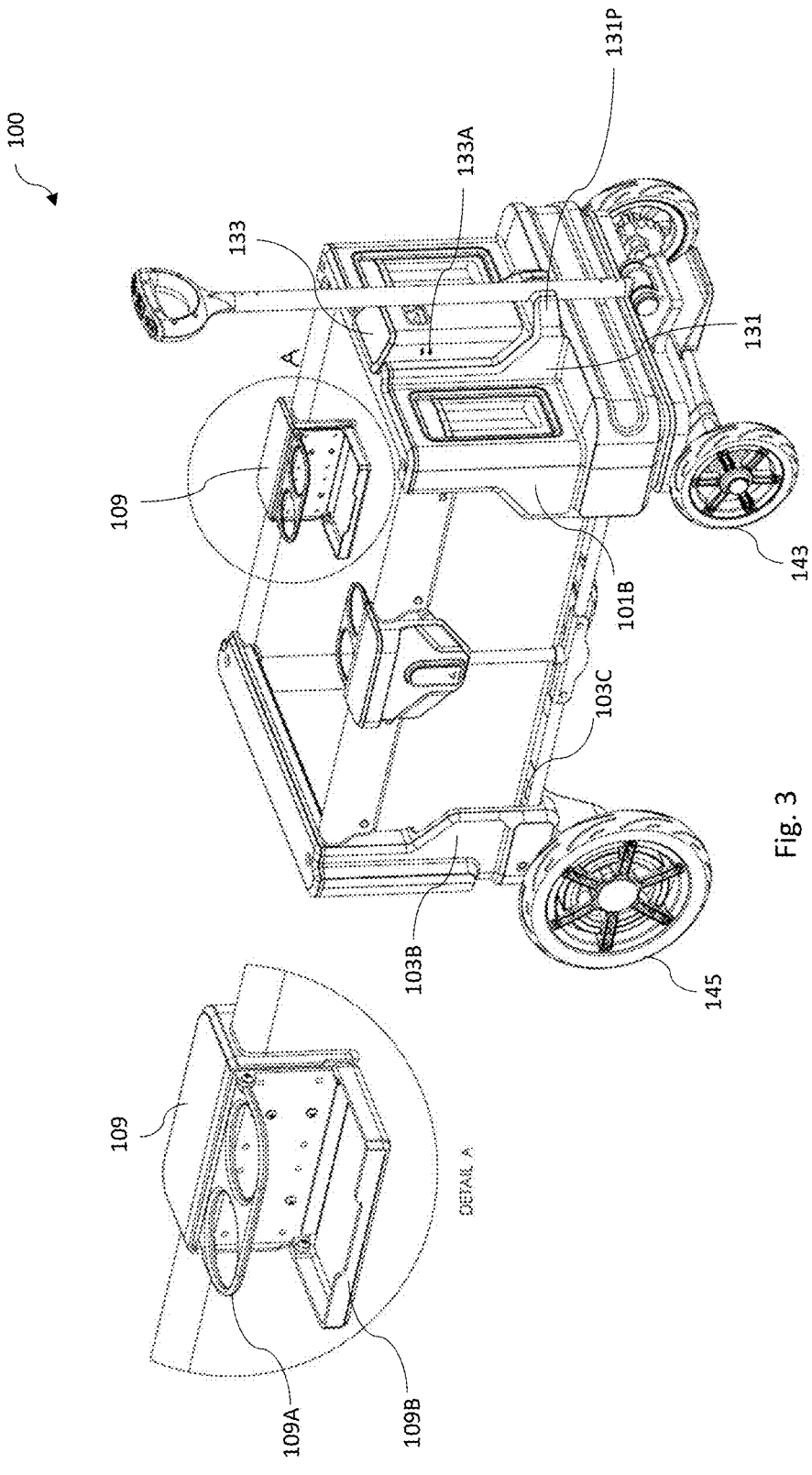

FIGS. 1-3 illustrate perspective views of an electric folding wagon 100 from different viewing angles, in an embodiment. The electric folding wagon 100 combines the convenience and portability of a folding wagon with the functionality and power of electric motor. The electric folding wagon 100 is designed to assist the user in carrying heavy loads over various terrains, providing an efficient and effortless transportation solution that is easy and portable to use.

The electric folding wagon 100 (may also be referred to as an electric wagon, a folding wagon, or a wagon) disclosed herein is a versatile and compact device that allows users to transport items with ease. It comprises a foldable frame, wheels, electric motor(s), a battery pack, and control mechanism. The folding feature enables the electric wagon 100 to be easily collapsed (e.g., folded) for storage and transportation purposes, while the electric motor(s) provides additional power to assist the user in moving heavy loads. Various components of the electric wagon 100 are discussed herein with reference to FIGS. 1-3. Note that some of the features may not be visible in a particular perspective view from a specific viewing angle, but are visible in another perspective view from another viewing angle.

As illustrated in FIGS. 1-3, the electric wagon 100 includes a front main body 101, a rear main body 103, and a frame 105 between, and connecting, the front main body 101 and the rear main body 103. The electric wagon 100 also includes folding control assemblies 109 for folding/unfolding of the electric wagon 100. One folding control assembly 109 is attached to the frame 105 on each side of the electric wagon 100, in the illustrated embodiment. The folding control assemblies 109 are considered as part of the frame 105, in some embodiments. In addition, the electric wagon 100 includes a fabric shell 107, which is attached to the front main body 101, the rear main body 103, and the frame 105 to form the cargo hold of the electric wagon 100. In the example of FIGS. 1-3, front wheels 143 are attached to the front main body 101, and rear wheels 145 are attached to the rear main body 103. The front wheels 143 and the rear wheels 145 may have pneumatic tires or solid rubber tires to provide excellent traction and maneuverability. Electric motors 147 (see, e.g., FIG. 2) are mechanically coupled to the rear wheels 145 to provide power assist. A handle 123 is attached to the front main body 101. A battery pack 133, which is a removable and rechargeable batter pack, is held by a battery housing 131 and powers the electric motors 147 and other electrical components of the electric wagon 100. More details are discussed hereinafter.

In some embodiments, the front main body 101 is a rigid structure that does not change its shape and/or dimensions during normal operation of the electric wagon 100. In an example embodiment, the front main body 101 is formed of a plastic material, and includes a front panel 101A, two front side panels 101B, and a front bottom panel 101C (see FIG. 2). Similarly, the rear main body 103 is a rigid structure (e.g., formed of a same plastics material as the front main body 101) and includes a rear panel 103A (see FIG. 2), two rear side panels 103B, and a rear bottom panel 103C (see FIG. 3).

The frame 105, which is a foldable frame, is disposed between, and attached to, the front main body 101 and the rear main body 103. The frame 105 is formed of a suitable rigid and light-weight material, such as a metal material(s). Example of metal material(s) for the frame 105 include steel, aluminum, titanium, an alloy, combinations thereof, and the like. Besides metal, other suitable materials, such as carbon fiber, may also be used to form the frame 105. In some embodiments, the frame 105 includes first metal bars extending between the front side panels 101B and the rear side panels 103B (which together define the two sides of the electric wagon 100). The front panel 101A and the rear panel 103A define the front side and the backside of the electric wagon 100, respectively. The frame 105 also includes second metal bars extending between the two sides of the electric wagon 100 at the bottom of the electric wagon 100, where the second metal bars extend perpendicular to the first metal bars and define the bottom of the electric wagon 100. Additional details of the frame 105 are discussed hereinafter with reference to FIGS. 9 and 10.

The fabric shell 107 is attached to the front main body 101, the rear main body 103, and the frame 105 to form the cargo hold (may also be referred to as the basket) of the electric wagon 100. The fabric shell 107 may be formed of a suitable fabric material (also referred to as a liner material), such as a polyester material, a canvas fabric, combinations thereof, or the like. The liner material of the fabric shell 107 may be stretchable to facilitate folding and unfolding of the electric wagon 100. In the illustrated embodiment, the fabric shell 107 is attached to the frame 105 by fasteners 106, which may be, e.g., buckles, clips, clasps, or the like. In some embodiments, the top portion of the front panel 101A may include a horizontal bar for attaching the fabric shell 107, which horizontal bar may be revealed by removing a front top cover 135 installed on the upper surface of the front panel 101A. To attached the fabric shell 107, the front top cover 135 is removed, the fabric shell 107 is attached to the horizontal bar of the front panel 101A, and the front top cover 135 is installed back on the upper surface of the front panel 101A. Similarly, the fabric shell 107 is attached to a horizontal bar at the top portion of the rear panel 103A, which may be revealed by removing a rear top cover 137 installed on the upper surface of the rear panel 103A. Note that in the illustrated embodiment, there are holes 136 in the front top cover 135, and there are holes 138 in the rear top cover 137. The holes 136 and 138 are located at the four corners of the electric wagon 100. As will be discussed hereinafter, poles 181 (see, e.g., FIG. 11) may rise from the holes 136 and 138 for attaching a sunroof 183.

Still referring to FIGS. 1-3, two front pockets 115 are formed at the front side (e.g., the side facing the handle 123) of the front panel 101A. Recesses in the front panel 101A may serve as the frame of the front pockets 115. Alternatively, a frame of the front pocket 115 may be attached to the front side of the front panel 101A. A suitable liner material, such as a webbing material, may be attached to the frame of the front packets 115.

In FIG. 1, the battery housing 131 is formed at the front side of the front panel 101A between the front pockets 115. The battery housing 131 may be formed of a same material (e.g., plastic) as the front main body 101. Lower portion of the battery housing 131 includes a pair of protruding portions that form a holder that can hold the handle 123 vertically in place for storage, e.g., when the handle 123 is not in use.

The battery pack 133 is configured to be inserted into or removed from the battery housing 131, e.g., along the vertical direction. The battery pack 133 is a rechargeable battery, such as a lithium-ion battery or other suitable battery, depending on the desired capacity and performance requirements. The battery pack 133 provides electric power to various components of the electric wagon 100, such as the motor(s), the light-emitting diode (LED) lights, the processor, the control interface, and so on. In the illustrated embodiment, the battery pack 133 provides charging ports 133A (see, e.g., FIG. 3), such as USB charging ports or other power outlets, for powering or charging electronic devices, such as mobile phones, camping lamps, portable radios, and so on. The battery pack 133 may be charged by connecting the battery pack 133 to a power source (e.g., a wall socket) while the battery pack 133 is inserted in the battery housing 131. This way, the battery pack 133 may provide power to the charging ports 133A while being charged by the power source. In addition, or alternatively, the battery pack 133 may be removed and charged in a dedicated charging station, and a replacement (or backup) battery pack may be inserted into the battery housing 131. In some embodiments, conductive wires electrically connecting the battery pack 133 and other electrical components (e.g., motors) may be placed/routed inside, e.g., some of the metal bars (which are hollow) of the frame 105.

In FIGS. 1-3, the front main body 101 has a utility compartment 111 that protrudes from a bottom portion of the front side of the front panel 101A. The interior of the utility compartment 111 provides a space for storing various components of the electric wagon 100, such as the processor and the motor control circuit of the electric wagon 100. The utility compartment 111 may also be used to store optional or spare parts of the electric wagon 100, such as a (foldable) sunroof/solar panel, or a backup battery pack, as examples. A front light 113, such as a light-emitting diode (LED) light, is embedded in the exterior surface of the utility compartment 111. Similarly, two back lights 141 (e.g., LED lights) are embedded in the rear panel 103A. Additionally, at the top corners of the electric wagon 100, such as at lower surfaces of the front top cover 135 and rear top cover 137 near the holes 136/138, LED lights may be installed for illumining the cargo of the electric wagon 100 at night time.

A lower base 117 is attached to the bottom of the front main body 101. The lower base 117 may be formed of a plastic material, such as the same plastic material as the front main body 101. The handle 123 is pivotally connected to a protrusion portion 119 of the lower base 117, and rotates around an axis 120. The handle 123 may be referred to as pivotally attached to the front main body 101 (e.g., through the lower base 117). When the operator (also referred to as the user) of the electric wagon 100 operates the electric wagon, the handle 123 pivots forward and is no longer in the vertical storage position. In some scenarios, the operator walks in front of the electric wagon 100 and pulls the handle 123 to drag the electric wagon 100 in the direction of travel. The electric wagon 100 is said to move forward. In other scenarios, the operator pushes the handle 123 and walks after the electric wagon 100. The electric wagon 100 is said to move backward.

The front wheels 143 are attached to the front main body 101, e.g., through the lower base 117. Two front wheels 143 are illustrated in FIGS. 1-3 as being attached to a front axis. In other embodiments, only one front wheel, such as a caster wheel, is used and is attached to the lower base 117. These and other variations are fully intended to be included within the scope of the present disclosure. In the illustrate embodiment, a brake pedal 121 is attached to the front axis, and is used to manually set the break for the electric wagon 100.

The rear wheels 145 are attached to the rear main body 103. In the illustrated embodiment, two rear wheels 145 are used. For each of the rear wheels 145, an electric motor 147 is integrated with the rear wheel 145, and is mechanically coupled to the rear wheel 145 to drive the rear wheel. The electric motor 147 may be any suitable motor, such as a brushless DC motor, a hub motor, or the like. The electric motor 147 may have a built-in electric brake, such that the rear wheel 145 may be locked (e.g., prevented from rotating) by an electric control signal, which may be used to implement an automatic emergency break function, details of which are discussed hereinafter. In some embodiments, a speed sensor is integrated in the rear wheel 145. The speed sensor may be used to detect movement of the electric wagon 100, and/or to measure the speed of the electric wagon 100. The output of the speed sensor is sent to the processor of the electric wagon 100 to achieve speed control in different operation modes (also referred to as modes for simplicity) of the electric wagon 100. The operator of the electric wagon 100 selects the operation mode of the electric wagon 100 through the control interface, in some embodiments.

The number of electric motors and the coupling between the electric motors and the rear wheels 145 shown in FIGS. 1-3 are illustrative and non-limiting. Other numbers of electric motors and other coupling methods between the electric motor(s) and the wheels of the electric wagon 100 are possible and are fully intended to be included within the scope of the present disclosure. For example, a single electric motor may be mechanically coupled to the rear axle, which rear axle is mechanically coupled to both rear wheels 145, such that the single electric motor drives both of the rear wheels 145. As another example, the electric motors may be coupled to the front wheels 143 instead of the back wheels 145. As yet another example, each of the wheels (e.g., 143, 145) of the electric wagon 100 may be coupled to and driven by an respective electric motor.

Figure 4A:
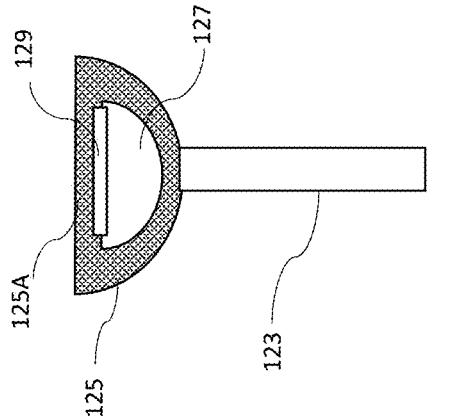
FIG. 4A illustrates a side view of a handle of the electric folding wagon, in an embodiment.

FIG. 4A illustrates a side view of the handle 123 of the electric folding wagon 100, in an embodiment. Note that for simplicity, only the top portion of the handle 123 is shown. At a distal end of the handle 123 is the handgrip 125 of the handle 123. The handgrip 125 has an opening 127. During operation of the electric wagon 100, the wagon operator's fingers extend through the opening 127 and wrap around a top bar 125A of the handgrip 125. A trigger 129 is formed at the lower surface of the top bar 125A. In some embodiments, the trigger 129 is spring loaded, and is at an OPEN position by default, which disconnects the electric motors 147 from the power supply and/or control signals from the processor 301 (see FIG. 13) of the electric wagon 100, such that no power assist is provided by the electric motors 147 to drive the electric wagon 100. When the operator's fingers press down the trigger 129, the trigger 129 is at a CLOSED position, which allows the electric motors 147 to be powered by the power supply from the battery pack 133 under the control of the processor 301, such that the electric motors 147 provide power assist to the operator. The control interface of the electric wagon 100 is embedded at a top surface of the top bar 125A, details are discussed below with reference to FIG. 4B.

Figure 4B:
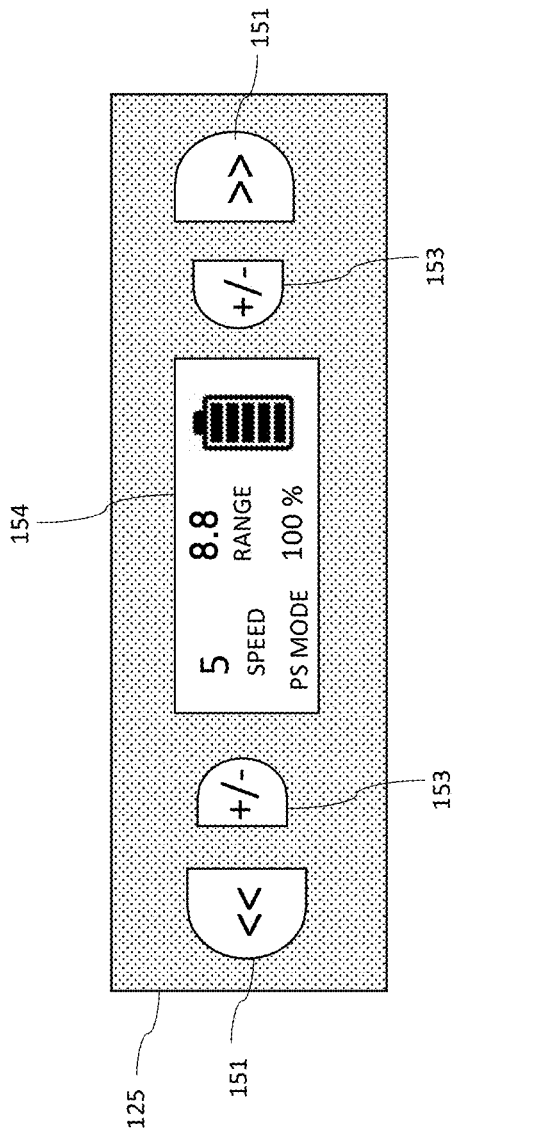
FIG. 4B illustrates a control interface of the electric folding wagon, in an embodiment.

FIG. 4B illustrate the control interface embedded at the handgrip 125 of the handle 123, in an embodiment. The control interface includes buttons 151 and 153, and a display panel 154 (e.g., an LCD display). The numbers of button and the layout of the control interface illustrated in FIG. 4B are illustrative and non-limiting. The operator of the electric wagon 100 may press the buttons 151 to cycle through and select different modes of the electric wagon, and may press the button 153 to change the setting (e.g., increase or decrease the value) for each selected mode. The display panel 154 shows information regarding operation of the electric wagon, such as selected operation mode, speed setting, battery information, estimated remaining range of the electric wagon, and so on. In an example embodiment, the control interface includes two sets of identical buttons (e.g., 151/153) laid out (e.g., positioned) symmetrically on the control interface. In other words, the two sets of buttons are positioned symmetrically about the display panel 154. This symmetry allows both left-handed users and right-handed users to operate the control interface with ease while holding the handgrip 125. The control interface may communicate with the processor 301 (see FIG. 13) of the electric wagon 100 through conductive wires (e.g., copper wires), in some embodiment. In other embodiments, the control interface may communicate with the processor 301 of the electric wagon 100 through wireless communication, e.g., using the Bluetooth wireless communication protocol, or any other suitable wireless communication protocol.

Figure 5:
FIGS. 5-8 illustrate a front view, a side view, a back view, and a top view, respectively, of the electric folding wagon, in an embodiment.
Figure 5:
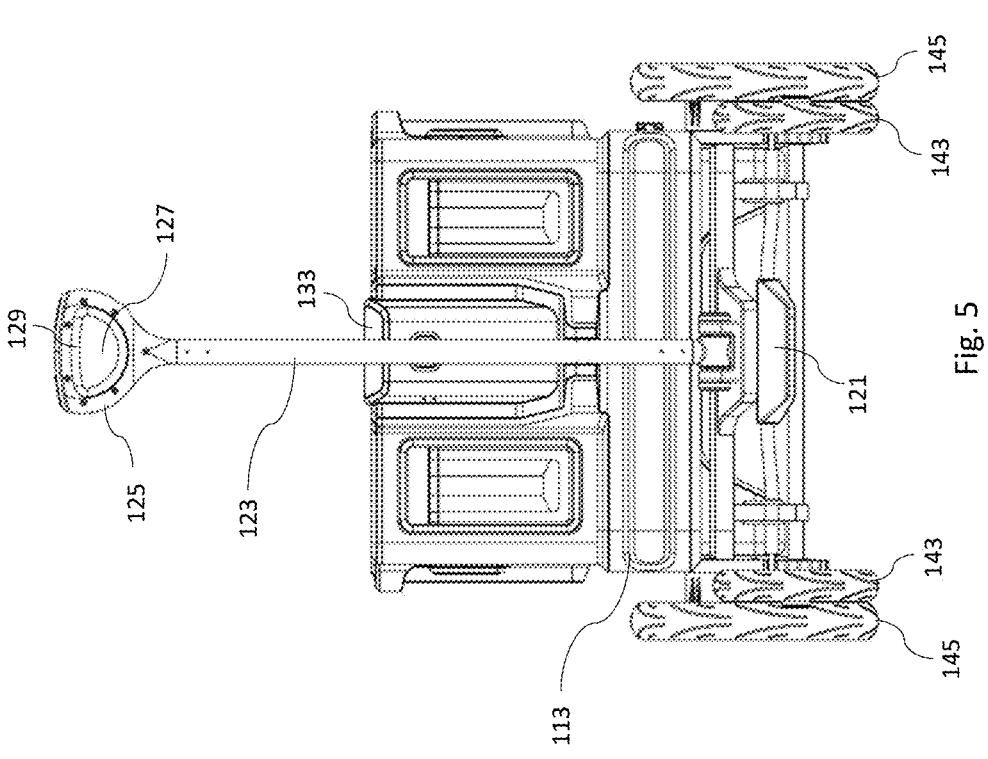
Figure 6:
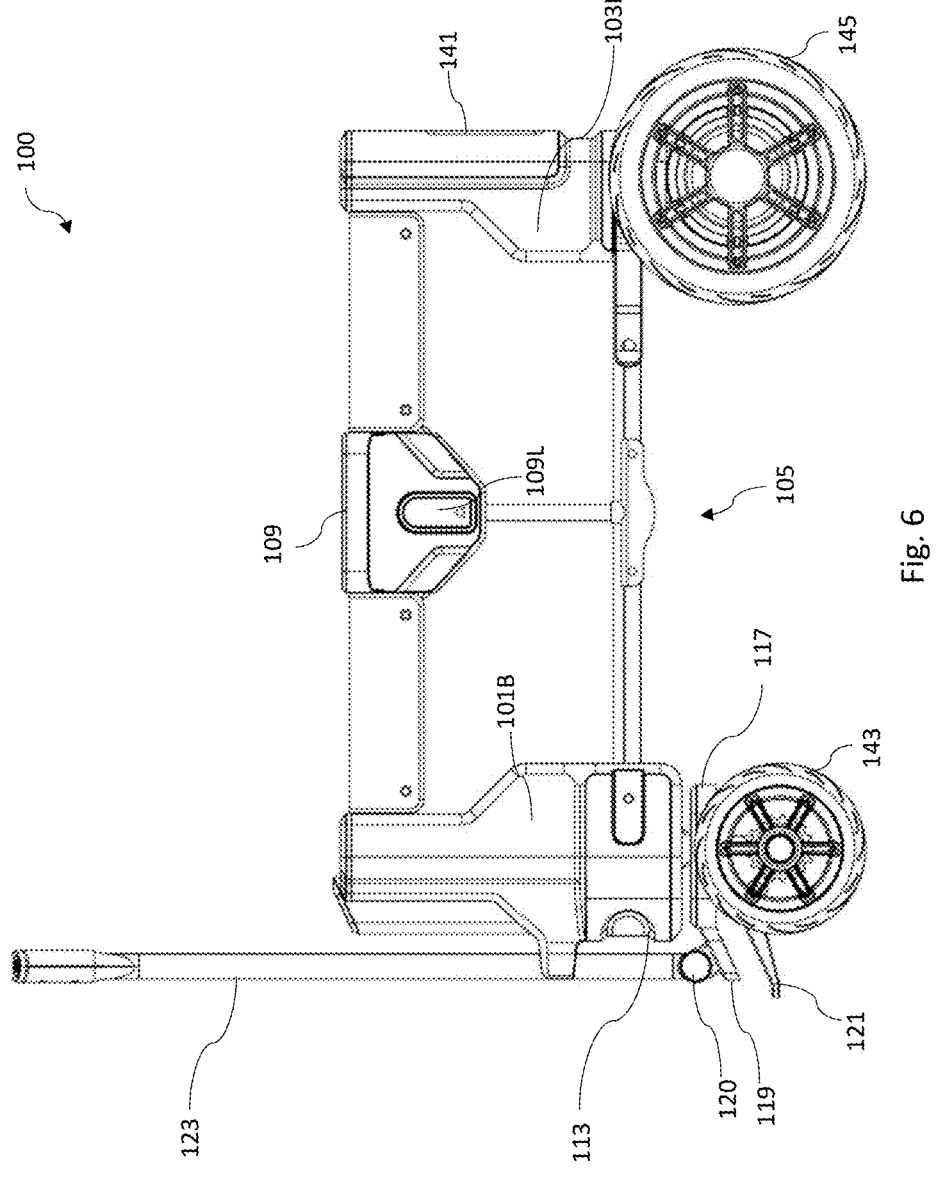
Figure 7:
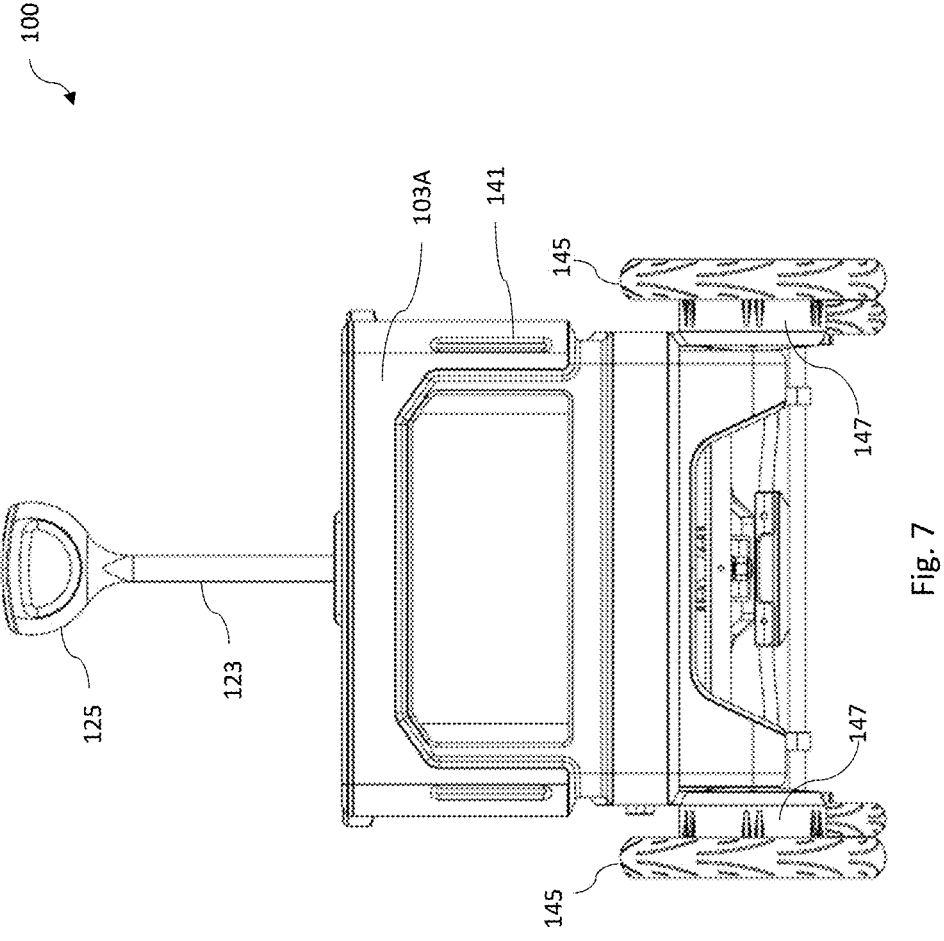
Figure 8:
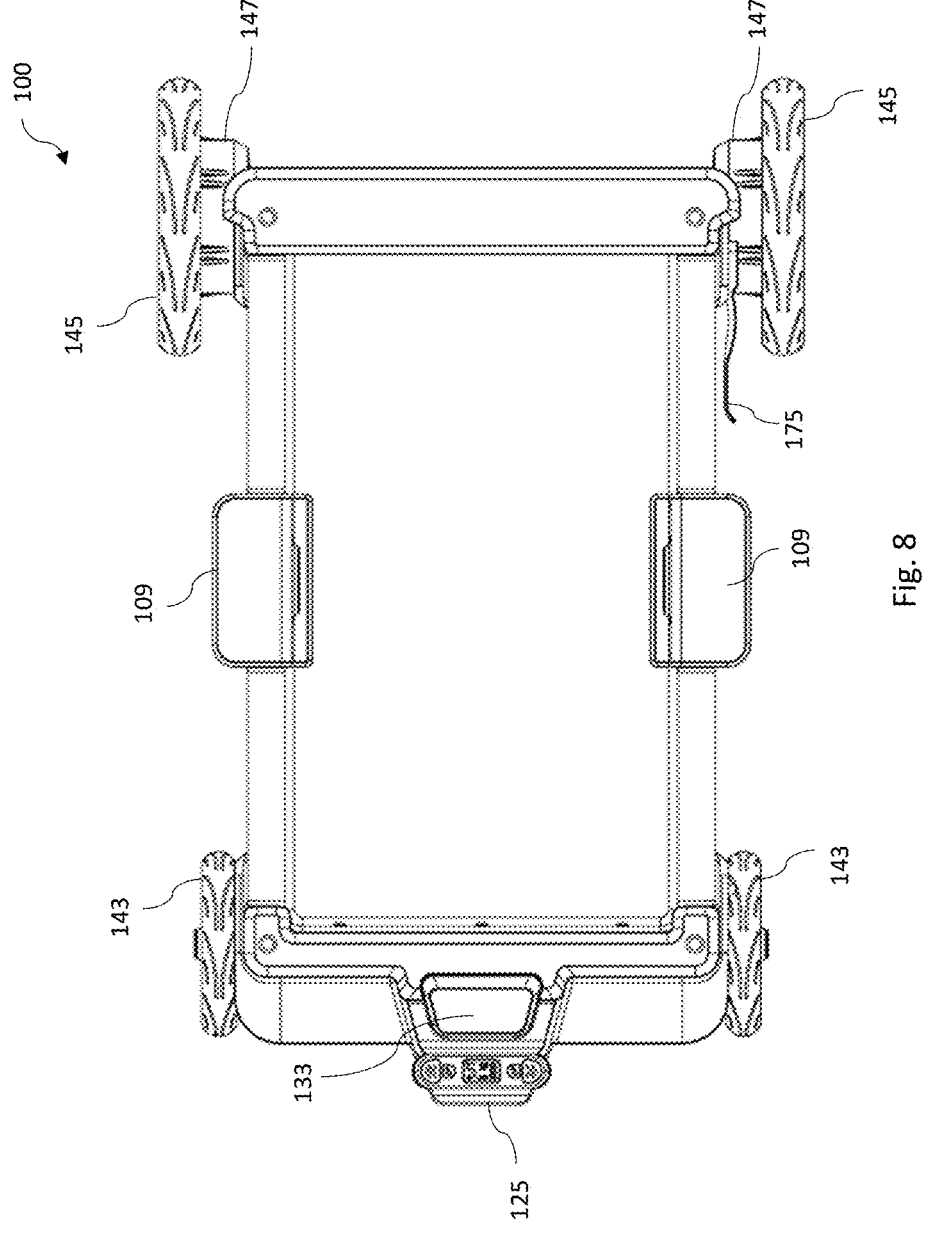

FIGS. 5-8 illustrate a front view, a side view, a back view, and a top view, respectively, of the electric folding wagon 100, in an embodiment. As shown in FIG. 5, the rear wheels 145 are larger than the front wheels 143. In addition, the track width of the rear wheels 145 is larger than the track width of the front wheels 143. This may advantageously allow the electric wagon 100 to be folded more tightly, since the front wheels 143 and the rear wheels 145 will not come into contact during folding to limit how close the front main body 101 and the rear main body 103 can get to each other.

Figure 9:
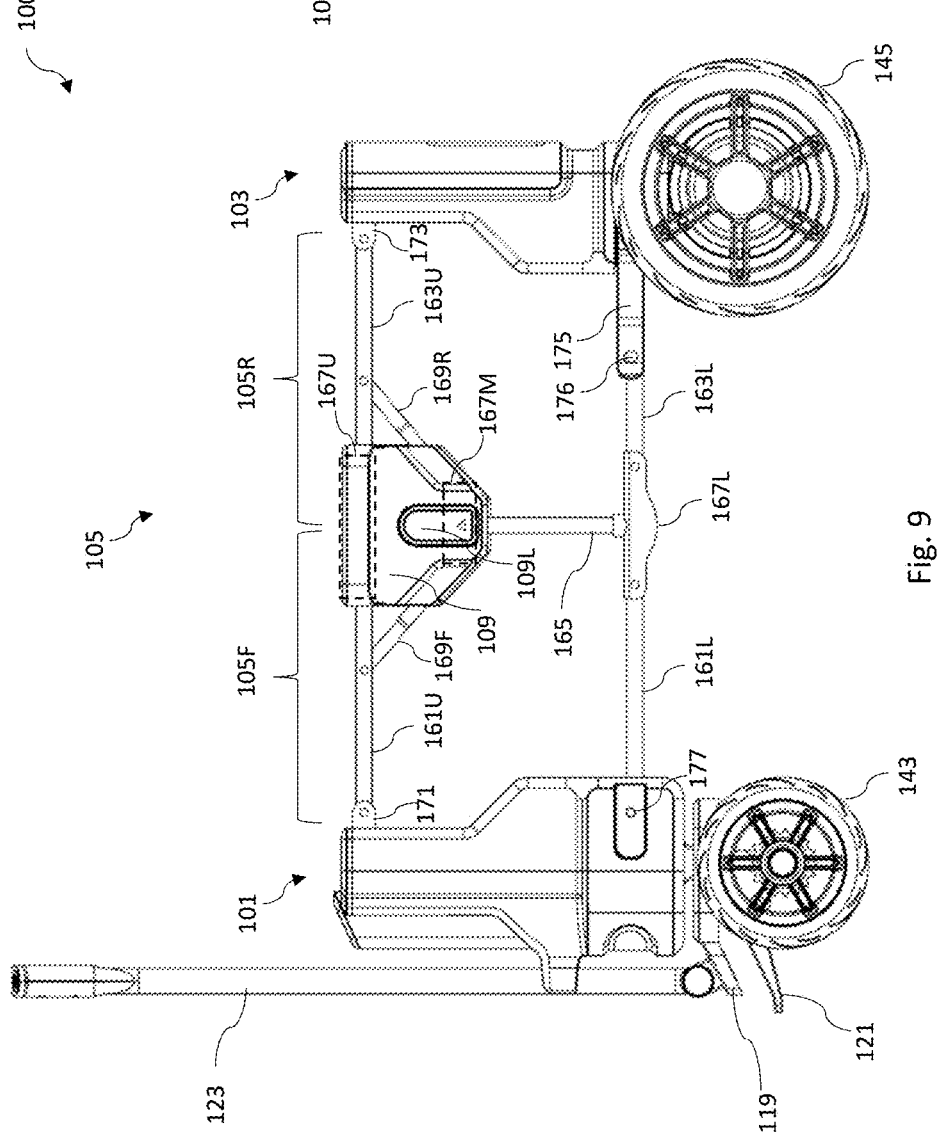
FIGS. 9 and 10 illustrate side views of the electric folding wagon in a use configuration and a folded configuration, respectively, in an embodiment.
Figure 10:
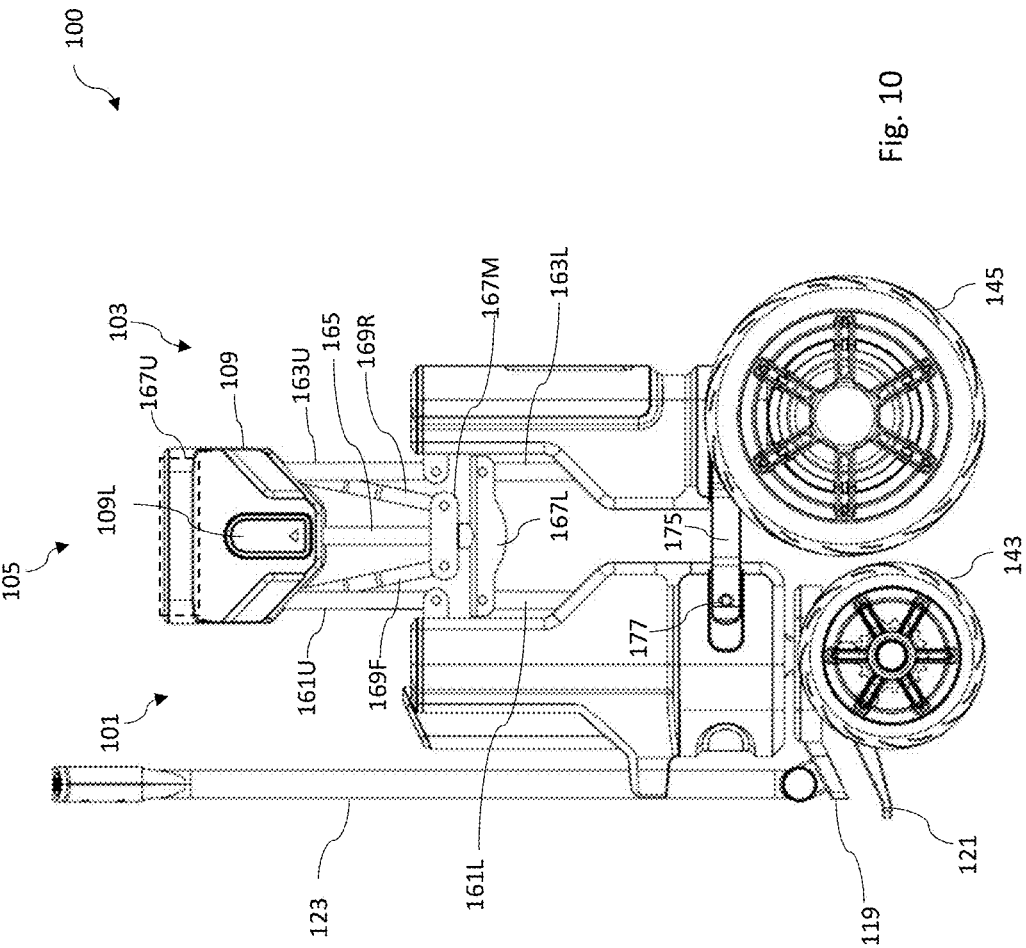

FIGS. 9 and 10 illustrate side views of the electric folding wagon 100 in a use configuration and a folded configuration, respectively, in an embodiment. To illustrate details of the frame 105, the fabric shell 107 is not shown in FIGS. 9 and 10. Note that FIGS. 9 and 10 show one side of the electric wagon 100, the portion of the frame 105 on the other side (e.g., the opposing side) of the electric wagon 100 is the same as the one shown in FIGS. 9 and 10, in the illustrated embodiment. The discussion below describes one side of the frame 105 as illustrated in FIGS. 9 and 10, with the understanding that the other side (e.g., the opposing side) of the frame 105 is the same as or similar to the side illustrated in FIGS. 9 and 10.

In FIG. 9, the electric wagon 100 is in the use configuration for carrying cargo. As illustrated in FIG. 9, the frame 105 includes a front frame assembly 105F, a rear frame assembly 105R, and a center linkage 165 (also referred to as to as a center bar) disposed laterally between the front frame assembly 105F and the rear frame assembly 105R. The frame 105 also includes an upper pivot bracket 167U, a lower pivot bracket 167L, and a middle pivot bracket 167M disposed vertically between the upper pivot bracket 167U and the lower pivot bracket 167L. The front frame assembly 105F and the rear frame assembly 105R are pivotally connected to the upper pivot bracket 167U, the lower pivot bracket 167L, and the middle pivot bracket 167M.

Note that in FIGS. 9 and 10, the upper pivot bracket 167U is located behind the folding control assembly 109, thus are not visible in the side view. In the example of FIGS. 9 and 10, the upper pivot bracket 167U is the same as the lower pivot bracket 167L, and is located in the dashed area pointed to by the label 167U. The middle pivot bracket 167M in FIG. 9 is located behind the folding control assembly 109 (thus not visible in FIG. 9), and is located in the dashed area pointed to by the label 167M. The middle pivot bracket 167M is visible and shown in FIG. 10 when the electric wagon 100 is in the folded configuration.

The front frame assembly 105F includes: an upper front side assembly 161U pivotally connected between a bracket 171 (which is attached to the front main body 101) and the upper pivot bracket 167U; a lower front side assembly 161L pivotally connected between another bracket (which is attached to the front main body 101, not shown) and the lower pivot bracket 167L; and a front support assembly 169F pivotally connected between the upper front side assembly 161U and the center linkage 165. The rear frame assembly 105R includes: an upper rear side assembly 163U pivotally connected between a bracket 173 (which is attached to the rear main body 103) and the upper pivot bracket 167U; a lower rear side assembly 163L pivotally connected between another bracket (which is attached to the rear main body 103, not shown) and the lower pivot bracket 167L; and a rear support assembly 169R pivotally connected between the upper rear side assembly 163U and the center linkage 165.

The folding control assembly 109 is attached to a top-middle portion of the frame 105. The folding control assembly 109 includes a housing (e.g., a plastic housing) that encases the upper pivot bracket 167U. The lower end of the center linkage 165 is attached (e.g., fixedly) to the lower pivot bracket 167L, and an upper end of the center linkage 165 is attached (e.g., fixedly) to the folding control assembly 109. In some embodiments, the center linkage 165 is a metal bar that extends through a hole in a middle section of the middle pivot bracket 167M, and the middle pivot bracket 167M can move along (e.g., slide up and down) the center linkage 165. The folding control assembly 109 has a locking mechanism and a lock release button 109L. When the electric wagon 100 is in the use configuration as shown in FIG. 9, the locking mechanism of the folding control assembly 109 locks the middle pivot bracket 167M at the position shown in the dashed box pointed to by the label 167M in FIG. 9. When locked in position, the middle pivot bracket 167M is prevented from moving (e.g., could not slide along the center linkage 165), and as a result, the center linkage 165, the front support assembly 169F, and the rear support assembly 169R are also held in position by the middle pivot bracket 167M. This ensures that the frame 105 is securely locked in the use configuration (e.g., not folded).

In the illustrated embodiment, the folding control assembly 109 has a built-in cup holder. Details of integrated cup-holder is shown in FIG. 3. Referring temporarily back to FIG. 3, the built-in cup holder includes a holder assembly 109A and a base assembly 109B. When not in use, the built-in cup holder is folded to save space. To use the built-in cup holder, the base assembly 109B is flipped downward and locked in an OPEN position, and the holder assembly 109A is flipped upward and stays in the upward position (e.g., using a spring attached to an axis of the holder assembly 109A). To fold the built-in cup holder, the holder assembly 109A is flipped downward, and the holder assembly 109A is flipped upward and locked in a CLOSED position.

FIG. 9 further shows a locking tab 175 with a hole 176. The locking tab 175 is attached to the lower rear side assembly 163L. FIG. 9 also shows a locking pin 177 attached to the lower front side assembly 161L. The locking tab 175 and the locking pin 177 are also illustrated in FIG. 1. As discussed hereinafter, when the electric wagon 100 is in the folded configuration, the locking pin 177 protrudes through the hole 176 of the locking tab 175 to securely keep the electric wagon 100 in the folded configuration.

FIG. 10 shows the electric wagon 100 in the folded configuration. In some embodiments, to fold the electric wagon 100, the lock release button 109L of the folding control assembly 109 is pushed (e.g., pressed down or pushed toward a pre-determined direction) to release the middle pivot bracket 167M from the locked position, such that the middle pivot bracket 167M is able to move freely (e.g., slide) along the center linkage 165. The folding control assembly 109 is then pulled upward away from the wheels, and/or the front main body 101 and the rear main body 103 are moved toward each other until the locking pin 177 and the locking tab 175 click into position, such that the locking pin 177 protrudes through the hole 176 of the locking tab 175.

As shown in FIG. 10, in the folded configuration, the lower front side assembly 161L and the lower rear side assembly 163L pivot upward, thereby raising the lower pivot bracket 167L. Similarly, the upper front side assembly 161U and the upper rear side assembly 163U pivot upward, thereby raising the upper pivot bracket 167U. In the example of FIG. 10, the upper pivot bracket 167U rises above an uppermost surface of the front main body 101 (or an uppermost surface of the rear main body 103). Note that during the transition from the use configuration to the folded configuration, the middle pivot bracket 167M slides downward along the center linkage 165, and rests on the raised lower pivot bracket 167L when the frame 105 is folded. In FIG. 9, the middle pivot bracket 167M is at a first location of the center linkage 165. In FIG. 10, the middle pivot bracket 167M is at a second location of the center linkage 165 different from the first location. A first distance between the middle pivot bracket 167M and the lower pivot bracket 167L, measured when the middle pivot bracket 167M is at the first location of the center linkage 165, is larger than a second distance between the middle pivot bracket 167M and the lower pivot bracket 167L measured when the middle pivot bracket 167M is at the second location of the center linkage 165. In other words, the distance between the middle pivot bracket 167M and the lower pivot bracket 167L is reduced when the frame 105 is folded.

Notably, due to the unique design of the frame 105 and the folding mechanism, during the folding process of the electric wagon 100, the front main body 101 and the rear main body 103 move toward each other in translational motion. In other words, the front main body 101 and the rear main body 103 move toward each other along a straight line without rotation of the front main body 101 and rotation of the rear main body 103. Since the front main body 101 and the rear main body 103 move toward each other along a straight line instead of a curved line, a particular form of translational motion, referred to as rectilinear motion, is experienced by the front main body 101 and the rear main body 103.

To unfold the electric wagon 100, the locking tab 175 is pulled outward away from the frame 105 such that the locking pin 177 is out of the hole 176, then the folding control assembly 109 is pushed downward, and/or the front main body 101 and the rear main body 103 are moved away from each other (e.g. in rectilinear motion). The middle pivot bracket 167M slides upward along the center linkage 165 during the transition from the folded configuration to the use configuration. When the frame 105 is fully unfolded, the locking mechanism of the folding control assembly 109 locks the middle pivot bracket 167M at the location shown in FIG. 9 to securely lock the frame 105 in the use configuration.

Figure 11:
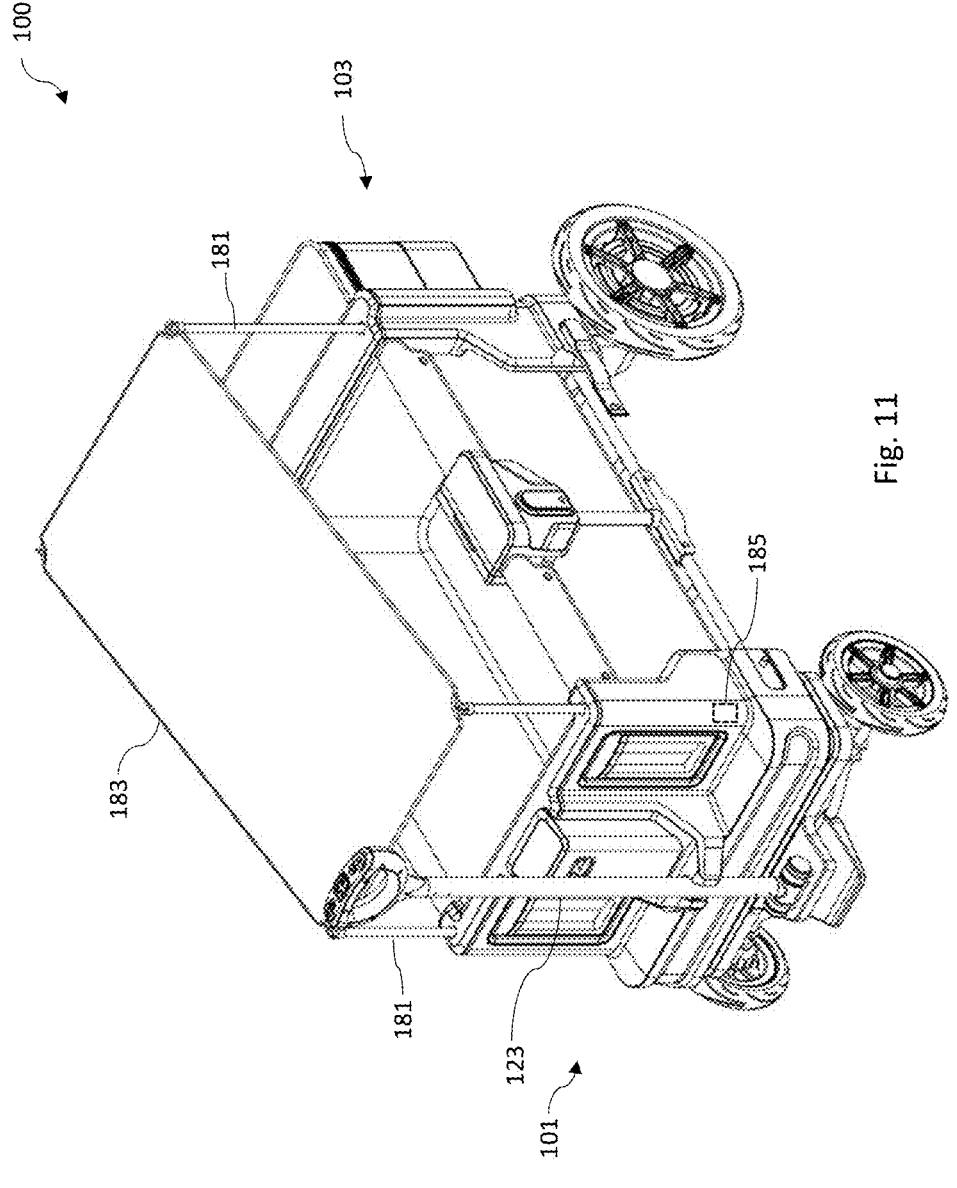
FIG. 11 illustrates a perspective views of the electric folding wagon with sunroof/solar panel, in an embodiment.

FIG. 11 illustrates a perspective views of the electric folding wagon 100 with sunroof and/or solar panel, in an embodiment. In some embodiments, poles 181 (also referred to as columns) are inserted into the holes 136/138 (see FIG. 1) at four corners of the electric wagon 100. A sunroof 183 is attached to the distal ends of the poles 181. The height of each of the poles 181 may be adjustable, e.g., by inserting the pole 181 to a desired depth inside the hole 136 or 138. The sunroof 183 may be made of, e.g., a polyester material. The sunroof 183 may be positioned at different angles for protecting the cargo load from sunlight, rain, dirt, and so on. The sunroof 183 may also be lowered all the way down to cover the cargo load and help secure the cargo load.

In some embodiments, the poles 181 are telescoping columns that are installed in the front main body 101 and the rear main body 103. Each of the telescoping columns is coupled to, and driven by, a respective electrical motor 185 (shown in phantom in FIGS. 11 and 12) embedded in the front main body 101 or the rear main body 103. Each of the telescoping columns may be raised or lowered (e.g., independently from other telescoping columns) to a desired height by the user through the control interface on the handgrip 125, or by the processor 301 of the electric wagon 100 automatically in a solar charging mode, details of which are discussed hereinafter.

In some embodiments, the sunroof 183 is a solar panel, or includes a solar panel integrated into the sunroof 183. For example, the sunroof 183 is formed of, or is coated with, a flexible organic material that functions as a solar panel that converts solar energy into electrical energy. The converted electrical energy is then stored in the battery pack 133 (e.g., used to charge the battery pack 133). In some embodiments, when the electric wagon 100 is in a solar charging mode (e.g., an operation mode selectable by the user through the control interface), the poles 181 (e.g., telescoping columns) are raised or lowered under the control of the processor 301 (see FIG. 13) to adjust the tilting angle of the solar panel, such that the solar panel is oriented toward the sun to increase or maximize the reception of solar energy.

In some embodiments, in the solar charging mode, the processor 301 performs a search operation to find the optimum or near-optimum position for each pole 181 for receiving solar energy. For example, the processor 301 may raise all of the poles 181 to a same height as a starting position, then adjust the height of a first pole 181 within a specific range from the starting position to find a best position for the first pole. The processor 301 may get a real-time measurement of the electrical energy (e.g., electrical current) generated by the solar panel, which real-time measurement is provided by a sensor (e.g., a current meter) embedded in or connected to the battery pack 133. The position of the first pole 181 that gives the maximum real-time measurement of the electrical energy is identified as the best position for the first pole 181. Once the best position for the first pole 181 is found, the processor 301 adjust the position for a second pole 181, using the same or similar method as discussed above for the first pole. This process repeats until the best positions for all poles 181 are found.

Figure 12:
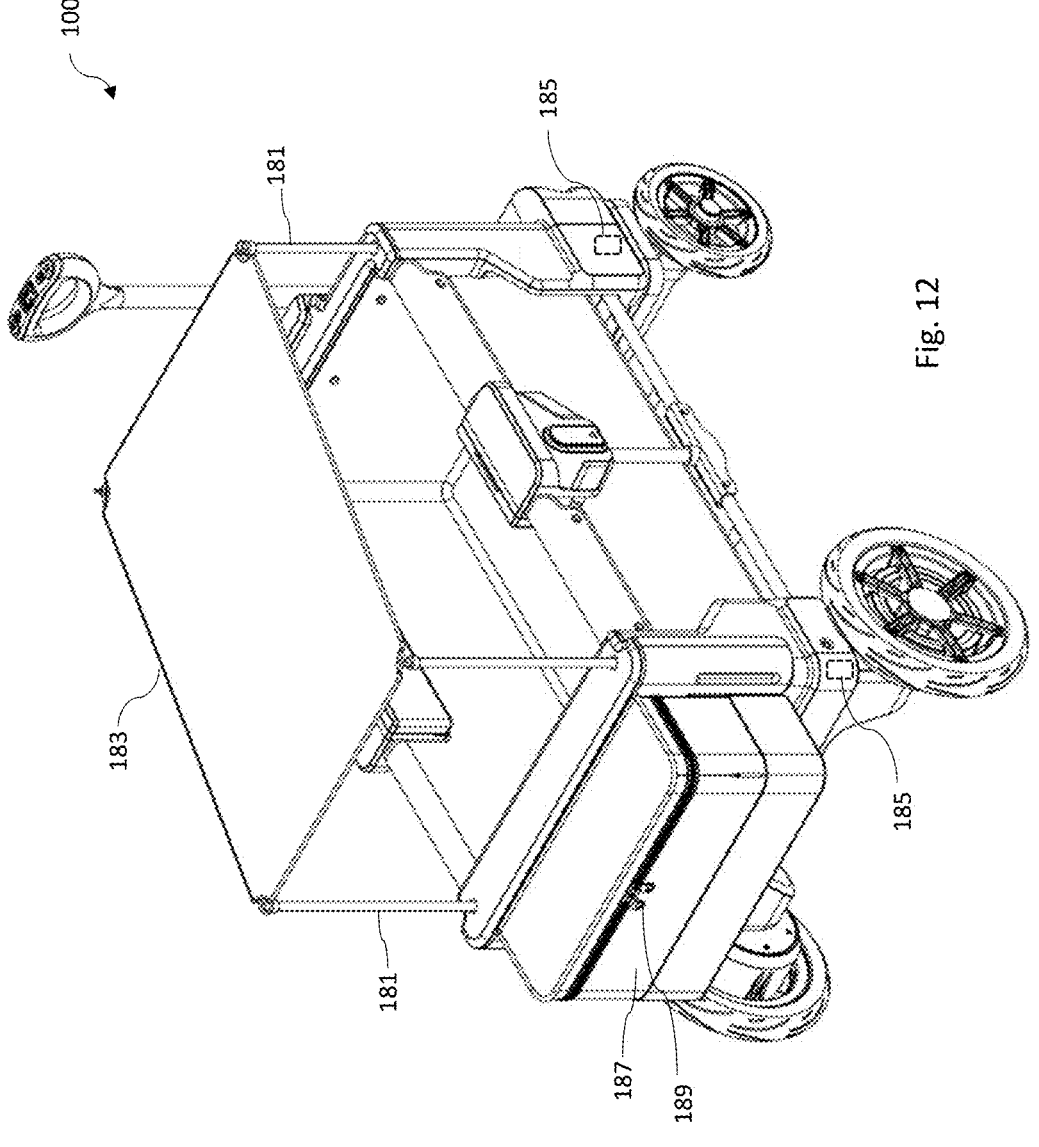
FIG. 12 illustrates a perspective views of the electric folding wagon with sunroof/solar panel, in another embodiment.

FIG. 12 illustrates a perspective views of the electric folding wagon 100 with sunroof and/or solar panel, in another embodiment. FIG. 12 shows the electric wagon 100 from a different viewing angle. The sunroof 183 is oriented at a different position from FIG. 12. In addition, FIG. 12 shows an optional back pocket 187 with zippers 189 attached to the rear main body 103. Although not shown, the electric wagon 100 may include an optional child safety restraint system (e.g., child safety harness), which may be installed (e.g., fastened to the frame 105) in the cargo hold area of the electric wagon 100 for a child sitting in the cargo hold area.

Figure 13:
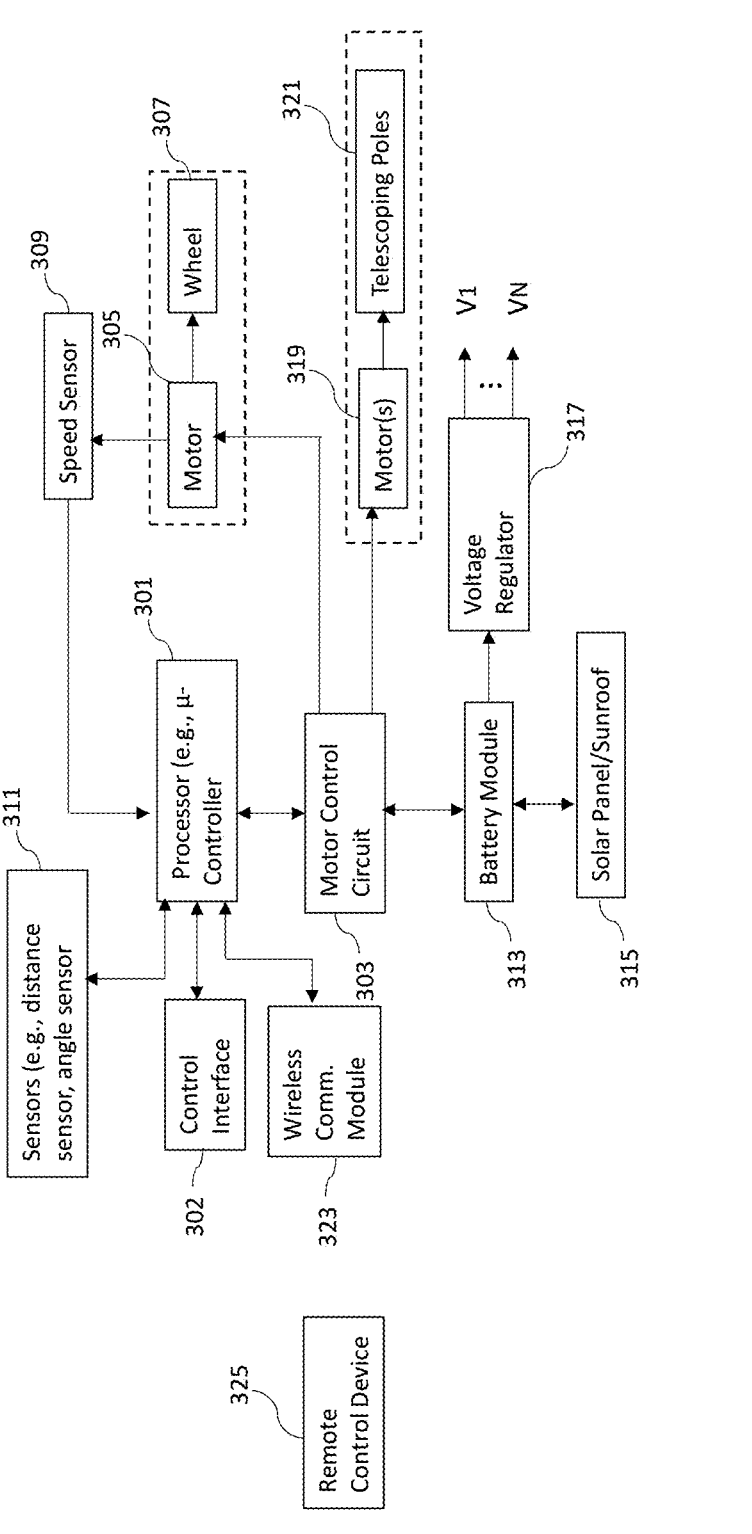
FIG. 13 illustrates a system block diagram of the electric folding wagon, in an embodiment.

FIG. 13 illustrates a system block diagram of the electric folding wagon 100, in an embodiment. Note that for simplicity, not all features of the electric folding wagon 100 are shown in FIG. 13.

As illustrated in FIG. 13, the electric folding wagon 100 includes a processor 301, a control interface 302 (which corresponds to the control interface embedded in the handgrip 125 in FIGS. 1-3), a motor control circuit 303, a wheel 307 (which corresponds to the rear wheel 145 in FIGS. 1-3), a motor 305 (which corresponds to the motor 147 in FIGS. 1-4) mechanically coupled to the wheel 307, and a speed sensor 309. The electric wagon 100 further includes a battery module 313 (which corresponds to the battery pack 133 in FIGS. 1-4), a voltage regulator module 317, solar panel/sunroof 315 (which corresponds to the sunroof 183 in FIGS. 11 and 12), and other sensors 311 (e.g., distance sensors, angle sensors, GPS sensors). Optionally, the electric wagon 100 may include telescoping columns 321 (which correspond to poles 181 in FIGS. 11 and 12) and motors 319 (which correspond to the motors 185 in FIGS. 11 and 12) for driving (e.g., raising or lowering) the telescoping columns 321, a wireless communication module 323, and a remote control device 325.

The processor 301 may be, e.g., a micro-controller for controlling various aspects of the operation of the electric wagon 100. The control interface 302 is used for setting/selecting the operation mode and parameters (e.g., speed of the wagon) of the operation mode. In some embodiments, the various operation modes include a power assist mode and an adaptive power assist mode. In the power assist mode, the user sets a target speed (e.g., 3 miles/hour) for the electric wagon 100. The processor 301 controls (e.g., increases or decreases) the speed of the motor 305 based on the measured speed from the speed sensor 309, such that the motor 305 drives the electric wagon 100 to move at the target speed. In the adaptive power assist mode, the user pulls or pushes the electric wagon 100 using the handle 213/handgrip 215 while walking. The processor 301 controls (e.g., increases or decreases) the speed of the motor 305 based on the measurement from the sensor 311, such that the motor 305 drives the electric wagon 100 to move at a speed matching the walking speed of the user. In other words, if the user walks faster, the processors 301 increases the speed of the motor 305 to match the user's speed; and if the user walks slower, the processors 301 decreases the speed of the motor 305 to match the user's speed. Details of the adaptive assist mode is discussed below with reference to FIG. 15.

The motor control circuit 303 includes circuits for generating, under the control of the processor 301, the control signals for controlling the operation (e.g., the start, the stop, the speed, and the direction (e.g., rotational direction)) of the various motors (305, 319) of the electric wagon 100. The speed senor 309 measures the speed (e.g. rotational speed) of the wheel 305, and the measurement of the speed sensor 309 is sent to the processor 301. The battery module 313 may include a sensor (e.g., a current measurement device) for measuring the electrical current provided by the solar panel/sunroof 315. The voltage regulator module 317 generates (e.g., derives) a plurality of supply voltages (e.g., $V_1$, $V_2$, ... $V_N$) with different voltage values from the battery module 313 to power different components of the electric wagon 100. The voltage regulator module may include a plurality of switched-mode power supply (SMPS) systems, such as Buck converters, Buck-Boost converters, or the like. The motors 319 are used to drive (e.g., raise or lower) the telescoping columns 321 for adjusting the orientation of the solar panel/sunroof 315. The wireless communication module 323 includes circuit for wireless communication between the processor 301 and the remote control device 325. The remote control device 325 may be, e.g., a smart phone running an application that communicates with the processor 301. The remote control device 325 may replace or supplement the control interface 302, and may be used to control the operation of the electric wagon 100 remotely (e.g., wirelessly). Sensors 311 may provide measurements of various aspect of the electric wagon 100 to support some operation modes of the electric wagon 100, details are discussed hereinafter.

Figure 14:
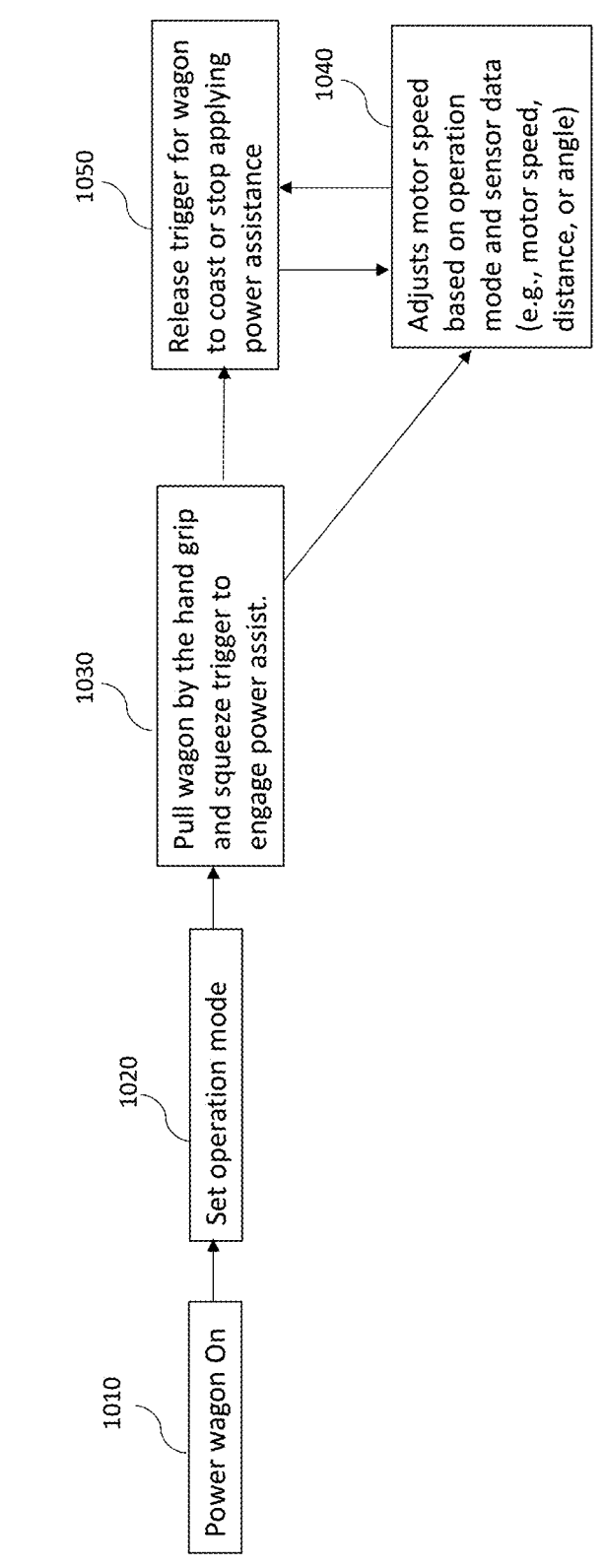
FIG. 14 illustrate a flow chart of a method of operating the electric folding wagon, in an embodiment.

FIG. 14 illustrate a flow chart of a method 1000 of operating the electric wagon 100, in an embodiment. It should be understood that the example method shown in FIG. 14 is merely an example of many possible example methods. One of ordinary skill in the art would recognize many variations, alternatives, and modifications. For example, various steps as illustrated in FIG. 14 may be added, removed, replaced, rearranged, or repeated.

Referring to FIG. 14, at block 1010, the electric wagon 100 is turned on, e.g., by pressing an ON/OFF button. At block 1020, the operation mode of the electric wagon 100 is set, e.g., through the control interface 302 or the remote control device 325. At block 1030, the user pulls the electric wagon 100 by the handgrip 125 and squeezes the trigger 129 to engage power assist. The processor 301 instructs motor(s) 305 to apply power assist in accordance with the operation mode setting. In block 1040, the processor 301 adjusts the speed of the motor(s) 305, based on selected operation mode and sensor data (e.g., motor speed, distance, or angle). In block 1050, the user releases the trigger 129 for the electric wagon 100 to coast or stop applying power assistance.

Figure 15:
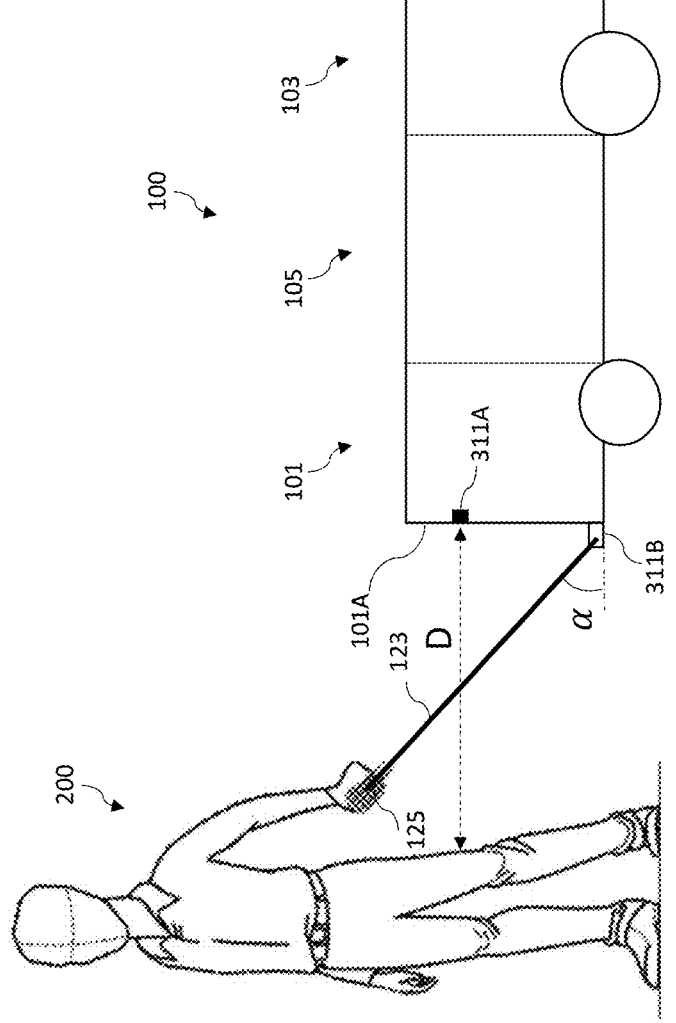
FIG. 15 illustrates an operation mode of the electric folding wagon, in an embodiment.

FIG. 15 illustrates the adaptive power assist mode of the electric folding wagon 100, in an embodiment. As shown in FIG. 15, a user 200 grabs the handgrip 125, selects the adaptive power assist mode of operation, and start walking. In the adaptive power assist mode, the processor 301 is programmed to maintain a substantially constant distance D between the user 200 and the electric wagon 100, or to maintain a substantially constant angle $\alpha$ between the handle 123 and a pre-determined direction (e.g., the horizontal direction in FIG. 15). Here, "substantially constant" means that the actual value for the distance D or the angle $\alpha$ is maintained within a small range (e.g., ±10%, ±5%, ±3%, or smaller) of the target constant value.

In some embodiments, a distance sensor 311A is embedded in the front panel 101A of the front main body 101. The distance sensor 311A may be, e.g., a time-of-flight (ToF) sensor, which measures the distance of a target by sending light pulses (e.g., laser pulses) toward the target and measuring the time it takes for the light pulses to be reflected and received at the ToF sensor. The processor 301 is programmed to adjust the speed of the motor(s) 305 to maintain a substantially constant value for the distance D. The distance D at the time the adaptive power assist mode is selected is used as the target constant distance value to maintain, in an embodiment.

In some embodiments, an angle sensor 311B is embedded in the axis 120 (see FIG. 1 or 6) of the handle 123. The angle sensor 311B measures the angle $\alpha$ in FIG. 15. The angle $\alpha$ is shown as the angle between the handle 123 and the horizontal direction in FIG. 15 as a non-limiting example. The angle $\alpha$ may be the angle between the handle 123 and the vertical direction in FIG. 15, as another example. The processor 301 is programmed to adjust the speed of the motor(s) 305 to maintain a substantially constant value for the angle $\alpha$. The angle $\alpha$ at the time the adaptive power assist mode is selected is used as the target constant distance value to maintain, in an embodiment.

In some embodiments, the processor 301 monitors the measured distance D from the distance sensor 311A, or the measured angle $\alpha$ from the angle sensor 311B, and adjusts (e.g., increases or decreases) the speed of the motor(s) 305 to maintain a substantially constant value for the measured distance D or the measured angle $\alpha$. For example, if the speed of the electric wagon 100 is higher than the walking speed of the user 200, the measured distance D may decrease over time, or the measured angle $\alpha$ may increase over time. The processor 301 detects the decrease in the measured distance D or the increase in the measured angle $\alpha$, and reduces the motor speed accordingly. In some embodiments, the measured data (e.g., distance D or the angle $\alpha$) over a pre-determined period of time are processed by the processor 301, such as filtered by a low-pass filter, before being used by the processor 301 to make decisions on increasing or decreasing the motor speed. The processor 301 may run some predictive algorithms to predict, based on the most recent measured data, when the measured data (e.g., distance D or the angle $\alpha$) will go out of the target range; and based on the prediction, decides when to send control signal to adjust the speed of the motor. This may avoid jitter in the amount of power assist provided by the motor(s) 305 and smooth the speed of the electric wagon 100.

In some embodiments, both the distance sensor 311A and the angle sensor 311B are used in the adaptive power assist mode to provide redundancy, in case the measurement from one sensor is unstable or unreliable. The processor 301 can monitor the measured data from both sensors (e.g., 311A and 311B), and dynamically switch between the measured data and use the measured data deemed reliable or high-quality for speed control. This may overcome some difficult operation conditions where one sensor may fail temporarily, and provides a more reliable and enjoyable user experience for the user.

FIG. 15 shows the user 200 pulls the handle 123 so that the electric wagon 100 follows the user 200. This is, of course, merely a non-limiting example. The electrical wagon 100 may be set to move backward (e.g., in front of the user) while the user 200 pushes the handle 123. The rotational direction of motor(s) 305 may be reversed to accommodate such movement, and the control mechanism for the power assist mode and the adaptive power assist mode discussed above also applies when the electric wagon 100 moves backward.

In some embodiments, when the processor 301 detects that the trigger 129 is in the OPEN position (e.g., not pressed by the user), and the speed sensor 309 senses movement (e.g., no-zero speed measured) of the wheel 307, the processor 301 may decide that the electric wagon 100 is rolling away (e.g., down a slope) and an automatic emergency break action is needed. The processor 301 sends a control signal to the electric break integrated in the wheel 307 to lock the wheel 307, thus preventing or stopping the rolling away of the electric wagon 100.

Figure 16:
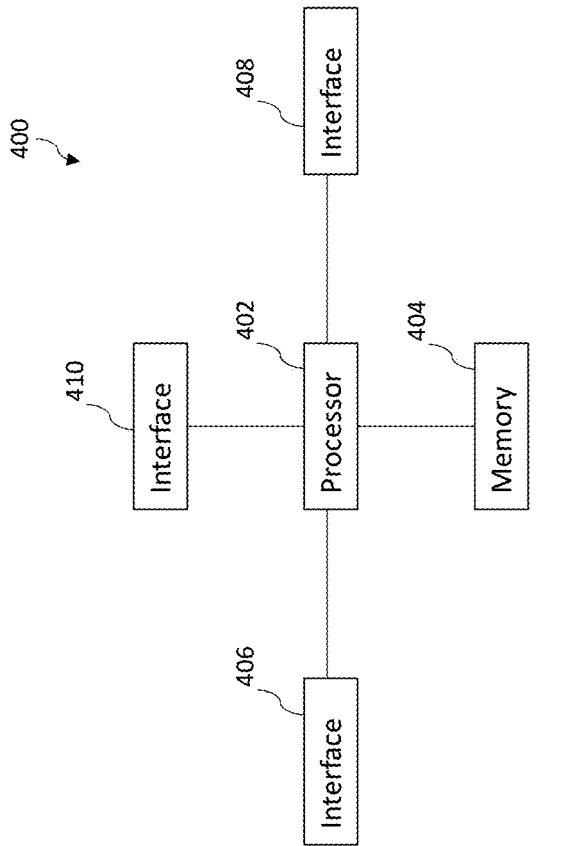
FIG. 16 is a block diagram of a processor system, in an embodiment.

FIG. 16 is a block diagram of a processor system 400, in an embodiment. The processor system 400 may be used as the processor 301 in FIG. 13. As shown in FIG. 16, the processor system 400 includes a processor 402, a memory 404, and interfaces 406-410, which may (or may not) be arranged as shown in FIG. 16. The processor 402 may be any component or collection of components adapted to perform computations and/or other processing related tasks, and the memory 404 may be any component or collection of components adapted to store programming and/or instructions for execution by the processor 402. In an embodiment, the memory 404 includes a non-transitory computer readable medium. The interfaces 406, 408, 410 may be any component or collection of components that allow the processor system 400 to communicate with other devices/components and/or a user. The processor system 400 may include additional components not depicted in FIG. 16, such as long-term storage (e.g., non-volatile memory).

The electric folding wagon 100 described herein provides an innovative and practical solution for users seeking a portable, electrically-powered transportation device. Its unique combination of folding functionality and electric assistance makes it ideal for a variety of applications. The compact design, ease of use, and enhanced maneuverability ensure that the electric folding wagon 100 offers a superior experience for users.

In an embodiment, a foldable wagon configurable in a use configuration and a folded configuration includes a frame that is foldable, wherein the frame comprises: a front frame assembly; a rear frame assembly; a center linkage disposed laterally between the front frame assembly and the rear frame assembly; an upper pivot bracket; a lower pivot bracket; and a middle pivot bracket disposed vertically between the upper pivot bracket and the lower pivot bracket, wherein the middle pivot bracket is slidable along the center linkage, wherein the front frame assembly and the rear frame assembly are pivotally connected to the upper pivot bracket, the lower pivot bracket, and the middle pivot bracket. In an embodiment, when the foldable wagon is in the use configuration, the middle pivot bracket is configured to be locked at a first location of the center linkage, wherein when the foldable wagon transitions from the use configuration to the folded configuration, the middle pivot bracket is configured to be unlocked and is slidable along the center linkage. In an embodiment, when the foldable wagon is in the folded configuration, the middle pivot bracket is at a second location of the center linkage, wherein a first distance between the middle pivot bracket and the lower pivot bracket, measured when the middle pivot bracket is at the first location of the center linkage, is larger than a second distance between the middle pivot bracket and the lower pivot bracket measured when the middle pivot bracket is at the second location of the center linkage. In an embodiment, the foldable wagon further comprises: a front main body attached to the front frame assembly; a rear main body attached to the rear frame assembly, wherein the front main body is laterally spaced apart from the rear main body; a fabric shell comprising a liner material, wherein the fabric shell is attached to the front main body, the rear main body, and the frame; one or more front wheels attached to the front main body; and rear wheels attached to the rear main body. In an embodiment, the foldable wagon is configured to be folded by: unlocking the middle pivot bracket; and moving the front main body and the rear main body toward each other while pulling the upper pivot bracket up, wherein the front main body and the rear main body experience translational motion while moving toward each other. In an embodiment, when the foldable wagon is in the folded configuration, the upper pivot bracket extends above an uppermost surface of the front main body. In an embodiment, the foldable wagon further includes: at least one electric motor mechanically coupled to the rear wheels; a battery pack configured to power the at least one electric motor; and a handle pivotally attached to the front main body, wherein the handle has a handgrip at a distal end of the handle, wherein the handgrip has a control interface for controlling operation of the foldable wagon. In an embodiment, the control interface has two sets of identical control buttons positioned symmetrically on the control interface. In an embodiment, the foldable wagon further includes: a speed sensor configured to measure a speed of the foldable wagon; a processor coupled to the speed sensor; and a non-transitory storage medium storing computer program for execution by the processor, wherein the processor, when executing the computer program, is configured to control the speed of the foldable wagon by sending a control signal to the at least one electric motor. In an embodiment, the foldable wagon further includes a distance sensor configured to measure a distance between the foldable wagon and an operator of the foldable wagon, wherein in an adaptive power assist operation mode of the foldable wagon, the processor is configured to maintain a substantially constant value for the distance between the foldable wagon and the operator of the foldable wagon. In an embodiment, the foldable wagon further includes an angle sensor configured to measure an angle between the handle of the foldable wagon and a pre-determined direction, wherein in an adaptive power assist operation mode of the foldable wagon, the processor is configured to maintain a substantially constant value for the angle. In an embodiment, the foldable wagon further includes: telescoping columns at corners of the foldable wagon; a plurality of motors coupled to respective ones of the telescoping columns, wherein each of the telescoping columns is configured be raised or lowered independently by a respective one of the plurality of motors under control of the processor; and a solar panel configured to be attached to the telescoping columns and charge the battery pack, wherein in a solar charging operation mode of the foldable wagon, the processor is configured to orient the solar panel toward the sun by raising or lowering each of the telescoping columns.

In an embodiment, an electrical wagon includes: a front main body, wherein the front main body is a first rigid structure and comprises a front panel, two front side panels, and a front bottom panel; a rear main body laterally spaced apart from the front main body, wherein the rear main body is a second rigid structure and comprises a rear panel, two rear side panels, and a rear bottom panel; a handle attached to the front main body, wherein the handle includes a handgrip at a distal end of the handle; a frame disposed between, and attached to, the front main body and the rear main body, wherein the frame is foldable, wherein the electric wagon is configured to switch between a use configuration and a folded configuration, wherein a shape of the front main body and a shape of the rear main body remain unchanged between the use configuration and the folded configuration; a fabric shell attached to the front main body, the rear main body, and the frame; one or more front wheels attached to the front main body; rear wheels attached to the rear main body; a battery pack; and at least one electric motor. In an embodiment, when the electric wagon is being folded, the front main body and the rear main body move toward each other in translational motion, wherein after the electric wagon is folded, a portion of the frame extends above an uppermost surface of the front main body and above an uppermost surface of the rear main body. In an embodiment, the frame includes: a front frame assembly; a rear frame assembly; a center linkage disposed laterally between the front frame assembly and the rear frame assembly; an upper pivot bracket; a lower pivot bracket; and a middle pivot bracket disposed vertically between the upper pivot bracket and the lower pivot bracket, wherein the middle pivot bracket is movable along the center linkage, wherein the front frame assembly and the rear frame assembly are pivotally connected to the upper pivot bracket, the lower pivot bracket, and the middle pivot bracket. In an embodiment, the electric wagon further includes: a speed sensor configured to measure a speed of the electric wagon; a processor coupled to the speed sensor and the at least one electric motor; and a non-transitory storage medium storing computer program for execution by the processor, wherein the processor, when executing the computer program for an adaptive power assist mode of the electric wagon, is configured to maintain a substantially constant distance between the electric wagon and an operator of the electric wagon by adjusting the speed of the electric wagon.

In an embodiment, an electrical wagon includes: a front main body having a rigid structure; a rear main body having a rigid structure and laterally spaced apart from the front main body; a handle attached to the front main body, wherein the handle includes a handgrip at a distal end of the handle, wherein the handgrip has a control interface configured to control operation of the electric wagon; a frame connecting the front main body and the rear main body, wherein the frame is foldable, wherein the electric wagon is configured to switch between a use configuration and a folded configuration, wherein a shape of the front main body and a shape of the rear main body remain unchanged between the use configuration and the folded configuration; a fabric shell attached to the front main body, the rear main body, and the frame; one or more front wheels attached to the front main body; rear wheels attached to the rear main body; an electric motor mechanically coupled to at least one of the rear wheels; a battery pack configured to power the electric motor; and a processor configured to control the electric motor. In an embodiment, when the electric wagon is being folded, the front main body and the rear main body move toward each other in translational motion, wherein after the electric wagon is folded, a portion of the frame extends above an uppermost surface of the front main body and above an uppermost surface of the rear main body. In an embodiment, the electrical wagon further includes: telescoping columns at corners of the electric wagon; a removable sunroof attached to distal ends of the telescoping columns; and a solar panel integrated in the removable sunroof, wherein the solar panel is configured to charge the battery pack. In an embodiment, the electrical wagon further includes a plurality of motors, wherein each of the plurality of motors is configured to raise or lower a respective one of the telescoping columns under control of the processor, wherein when operating in a solar charging mode, the processor is configured to orient the solar panel toward the sun by raising or lowering each of the telescoping columns.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A foldable wagon configurable in a use configuration and a folded configuration, the foldable wagon comprising:
a frame that is foldable, wherein the frame comprises:
    a front frame assembly comprising an upper front side assembly;
    a rear frame assembly comprising an upper rear side assembly;
    a center linkage disposed laterally between the front frame assembly and the rear frame assembly;

an upper pivot bracket disposed between and pivotally connected to the upper front side assembly and the upper rear side assembly;
    a lower pivot bracket;
    a front support assembly;
    a rear support assembly; and
    a middle pivot bracket disposed vertically between the upper pivot bracket and the lower pivot bracket, wherein the middle pivot bracket is slidable along the center linkage, wherein the front frame assembly and the rear frame assembly are pivotally connected to the upper pivot bracket, the lower pivot bracket, and the middle pivot bracket, wherein the middle pivot bracket is pivotally connected to the upper front side assembly via the front support assembly and the upper rear side assembly via the rear support assembly.

2. The foldable wagon of claim 1, wherein the foldable wagon further comprises a folding control assembly including a housing that encases the upper pivot bracket: wherein when the foldable wagon is in the use configuration, the middle pivot bracket is configured to be disposed within the housing and locked at a first location of the center linkage by the folding control assembly 109, wherein when the foldable wagon transitions from the use configuration to the folded configuration, the middle pivot bracket is configured to be unlocked and is slidable along the center linkage.

3. The foldable wagon of claim 2, wherein when the foldable wagon is in the folded configuration, the middle pivot bracket is at a second location of the center linkage, wherein a first distance between the middle pivot bracket and the lower pivot bracket, measured when the middle pivot bracket is at the first location of the center linkage, is larger than a second distance between the middle pivot bracket and the lower pivot bracket measured when the middle pivot bracket is at the second location of the center linkage.

4. The foldable wagon of claim 3, further comprising:
a front main body attached to the front frame assembly;
a rear main body attached to the rear frame assembly, wherein the front main body is laterally spaced apart from the rear main body;
a fabric shell comprising a liner material, wherein the fabric shell is attached to the front main body, the rear main body, and the frame;
one or more front wheels attached to the front main body; and
rear wheels attached to the rear main body.

5. The foldable wagon of claim 4, wherein the foldable wagon is configured to be folded by:
unlocking the middle pivot bracket; and
moving the front main body and the rear main body toward each other while pulling the upper pivot bracket up, wherein the front main body and the rear main body experience translational motion while moving toward each other.

6. The foldable wagon of claim 5, wherein when the foldable wagon is in the folded configuration, the upper pivot bracket extends above an uppermost surface of the front main body.

7. The foldable wagon of claim 4, further comprising:
at least one electric motor mechanically coupled to the rear wheels;
a battery pack configured to power the at least one electric motor; and
a handle pivotally attached to the front main body, wherein the handle has a handgrip at a distal end of the handle, wherein the handgrip has a control interface for controlling operation of the foldable wagon.

8. The foldable wagon of claim 7, wherein the control interface has two sets of identical control buttons positioned symmetrically on the control interface.

9. The foldable wagon of claim 7, further comprising:
a speed sensor configured to measure a speed of the foldable wagon;
a processor coupled to the speed sensor; and
a non-transitory storage medium storing computer program for execution by the processor, wherein the processor, when executing the computer program, is configured to control the speed of the foldable wagon by sending a control signal to the at least one electric motor.

10. The foldable wagon of claim 9, further comprising a distance sensor configured to measure a distance between the foldable wagon and an operator of the foldable wagon, wherein in an adaptive power assist operation mode of the foldable wagon, the processor is configured to maintain a substantially constant value for a target distance between the foldable wagon and the operator of the foldable wagon, wherein the distance is measured at the time the adaptive power assist mode is selected and is used as the target distance to maintain.

11. The foldable wagon of claim 9, further comprising an angle sensor configured to measure an angle between the handle of the foldable wagon and a pre-determined direction, wherein in an adaptive power assist operation mode of the foldable wagon, the processor is configured to maintain a substantially constant value for a target angle between the handle of the foldable wagon and the pre-determined direction, wherein the angle is measured at the time the adaptive power assist mode is selected and is used as the target angle to maintain.

12. The foldable wagon of claim 9, further comprising:
telescoping columns at corners of the foldable wagon;
a plurality of motors coupled to respective ones of the telescoping columns, wherein each of the telescoping columns is configured be raised or lowered independently by a respective one of the plurality of motors under control of the processor; and
a solar panel configured to be attached to the telescoping columns and charge the battery pack, wherein in a solar charging operation mode of the foldable wagon, the processor is configured to orient the solar panel toward the sun by raising or lowering each of the telescoping columns.

13. An electrical wagon comprising:
a front main body, wherein the front main body is a first rigid structure and comprises a front panel, two front side panels, and a front bottom panel;
a rear main body laterally spaced apart from the front main body, wherein the rear main body is a second rigid structure and comprises a rear panel, two rear side panels, and a rear bottom panel;
a handle attached to the front main body, wherein the handle includes a handgrip at a distal end of the handle;
a frame comprising:
a front frame assembly;
a rear frame assembly; and
a center linkage disposed laterally between the front frame assembly and the rear frame assembly; wherein the frame is disposed between, and pivotally attached to, the front side panels of the front main body and the rear side panels of the rear main body, wherein the frame is foldable such that the front frame assembly and the rear frame assembly pivot around the center linkage, wherein the electric wagon is configured to switch between a use configuration and a folded configuration, wherein a shape and orientation of the front side panels of the front main body and a shape and orientation of the rear side panels of the rear main body remain unchanged between the use configuration and the folded configuration;
a fabric shell attached to the front main body, the rear main body, and the frame;
one or more front wheels attached to the front main body;
rear wheels attached to the rear main body;
a battery pack; and
at least one electric motor.

14. The electrical wagon of claim 13, wherein when the electric wagon is being folded, the front main body and the rear main body move toward each other in translational motion, wherein after the electric wagon is folded, a portion of the frame extends above an uppermost surface of the front main body and above an uppermost surface of the rear main body.

15. The electric wagon of claim 13, wherein the frame further comprises:
an upper pivot bracket;
a lower pivot bracket; and
a middle pivot bracket disposed vertically between the upper pivot bracket and the lower pivot bracket, wherein the middle pivot bracket is movable along the center linkage, wherein the front frame assembly and the rear frame assembly are pivotally connected to the upper pivot bracket, the lower pivot bracket, and the middle pivot bracket.

16. The electric wagon of claim 13, further comprising:
a distance sensor configured to measure a distance between the electric wagon and an operator of the electric wagon;
a speed sensor configured to measure a speed of the electric wagon;
a processor coupled to the speed sensor and the at least one electric motor; and
a non-transitory storage medium storing computer program for execution by the processor, wherein the processor, when executing the computer program for an adaptive power assist mode of the electric wagon, is configured to maintain a substantially constant distance between the electric wagon and the operator of the electric wagon by adjusting the speed of the electric wagon, wherein the distance is measured at the time the adaptive power assist mode is selected and is used as the substantially constant distance to maintain.

17. An electrical wagon comprising:
a front main body having a rigid structure;
a rear main body having a rigid structure and laterally spaced apart from the front main body;
a handle attached to the front main body, wherein the handle includes a handgrip at a distal end of the handle, wherein the handgrip has a control interface configured to control operation of the electric wagon;
a frame connecting the front main body and the rear main body, wherein the frame is foldable, wherein the electric wagon is configured to switch between a use configuration and a folded configuration, wherein a shape of the front main body and a shape of the rear main body remain unchanged between the use configuration and the folded configuration;

a fabric shell attached to the front main body, the rear main body, and the frame;

one or more front wheels attached to the front main body;

rear wheels attached to the rear main body;

an electric motor mechanically coupled to at least one of the rear wheels;

a battery pack configured to power the electric motor; a processor configured to control the electric motor;

telescoping columns at corners of the electric wagon;

a removable sunroof attached to distal ends of the telescoping columns;

a solar panel integrated in the removable sunroof, wherein the solar panel is configured to charge the battery pack; and a plurality of motors, wherein each of the plurality of motors is configured to raise or lower a respective one of the telescoping columns under control of the processor, wherein when operating in a solar charging mode, the processor is configured to orient the solar panel toward the sun by raising or lowering each of the telescoping columns.

18. The electrical wagon of claim 17, wherein when the electric wagon is being folded, the front main body and the rear main body move toward each other in translational motion, wherein after the electric wagon is folded, a portion of the frame extends above an uppermost surface of the front main body and above an uppermost surface of the rear main body.

19. The electrical wagon of claim 17, further comprising an angle sensor configured to measure an angle between the handle of the electric wagon and a pre-determined direction, wherein in an adaptive power assist operation mode of the electric wagon, the processor is configured to maintain a substantially constant value for a target angle between the handle of the electric wagon and the pre-determined direction, wherein the angle is measured at the time the adaptive power assist mode is selected and is used as the target angle to maintain.

20. The electrical wagon of claim 17, further comprising a distance sensor configured to measure a distance between the electric wagon and an operator of the electric wagon, wherein in an adaptive power assist operation mode of the electric wagon, the processor is configured to maintain a substantially constant value for a target distance between the electric wagon and the operator of the electric wagon, wherein the distance is measured at the time the adaptive power assist mode is selected and is used as the target distance to maintain.

\* \* \* \* \*